United States Patent [19]

Nakashima et al.

[11] Patent Number: 5,566,253
[45] Date of Patent: Oct. 15, 1996

[54] METHOD, A DEVICE AND APPARATUS FOR PROCESSING VALUES CORRESPONDING TO MEASUREMENTS OF PIXELS, AND A FACSIMILE SYSTEM AND A DATA PROCESSING SYSTEM

[75] Inventors: Keisuke Nakashima, Hitachi; Masaharu Tadauchi, Yokohama; Toshiaki Nakamura, Yokohama; Noboru Suemori, Yokohama, all of Japan

[73] Assignee: Hitachi, Ltd., Tokyo, Japan

[21] Appl. No.: 920,177

[22] Filed: Jul. 27, 1992

Related U.S. Application Data

[63] Continuation of Ser. No. 714,350, Jun. 12, 1991, abandoned, which is a continuation of Ser. No. 410,336, Sep. 20, 1989, abandoned.

[30] Foreign Application Priority Data

Sep. 20, 1988 [JP] Japan ................... 63-233530

[51] Int. Cl.$^6$ ................................................. G06K 9/36
[52] U.S. Cl. ................................. 382/299; 382/268
[58] Field of Search ................... 382/41, 50, 54, 382/276, 299, 300, 267, 268, 269, 270; 358/140, 447, 459

[56] References Cited

U.S. PATENT DOCUMENTS

| | | | |
|---|---|---|---|
| Re. 32,291 | 11/1986 | Nakagome | 358/261 |
| 4,084,183 | 4/1978 | Keller et al. | 358/75 |
| 4,551,768 | 11/1985 | Tsuchiya et al. | 358/283 |
| 4,686,698 | 8/1987 | Tompkin et al. | 358/181 |
| 4,710,822 | 12/1987 | Matsunawa | 358/280 |
| 4,717,962 | 1/1988 | Moore | 358/260 |
| 4,797,942 | 1/1989 | Burt | 382/41 |
| 4,972,256 | 11/1990 | Hirosawa | 358/447 |
| 5,153,749 | 10/1992 | Katayama | 358/447 |

FOREIGN PATENT DOCUMENTS 2172169  9/1986  United Kingdom.

*Primary Examiner*—Yon J. Couso
*Attorney, Agent, or Firm*—Kenyon & Kenyon

[57] ABSTRACT

A device for processing values corresponding to measurement of pixels, includes an input inputting a j th primary density information $X_j$ representing density information of the j th pixel of an image, where the j th pixel includes a part which overlaps the previous (j–1)th pixel. A calculator calculates the j th secondary density information $\Delta X_j$ which represents the density information of the part of the j th pixel which does not overlap the (j–1)th pixel, on the basis of at least the j th primary density information $X_j$ and of the previously calculated secondary density information. A memory stores at least one of the j th primary density information $X_j$ and the j th secondary density information $\Delta X_j$. The device can be used in a facsimile system and a data processing system.

45 Claims, 18 Drawing Sheets

|  γ<br>0.125 | β<br>−0.625 | γ<br>0.125 |
|---|---|---|
| β<br>−0.625 | α<br>3 | β<br>−0.625 |
| γ<br>0.125 | β<br>−0.625 | γ<br>0.125 |

FIG.10(a)

|  γ<br>0.125 | β<br>−0.5 | γ<br>0.125 |
|---|---|---|
| β<br>−0.5 | α<br>2.5 | β<br>−0.5 |
| γ<br>0.125 | β<br>−0.5 | γ<br>0.125 |

FIG.10(b)

|  γ<br>0 | β<br>−0.5 | γ<br>0 |
|---|---|---|
| β<br>−0.5 | α<br>3 | β<br>−0.5 |
| γ<br>0 | β<br>−0.5 | γ<br>0 |

FIG.10(c)

|  γ<br>0 | β<br>−0.25 | γ<br>0 |
|---|---|---|
| β<br>−0.25 | α<br>2 | β<br>−0.25 |
| γ<br>0 | β<br>−0.25 | γ<br>0 |

FIG.10(d)

```
IF (Ro.GE.TH)  THEN

So = 1
    ER = Ro-255

ELSE

So = 0
    ER = Ro

END IF

R1 = R1+ER* 7/16
R2 = R2+ER* 3/16
R3 = R3+ER* 5/16
R4 = R4+ER* 1/16
```

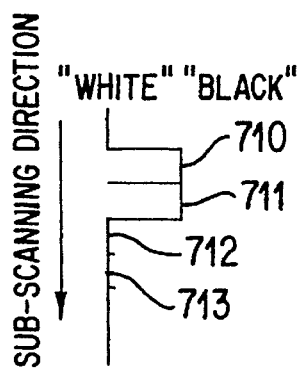
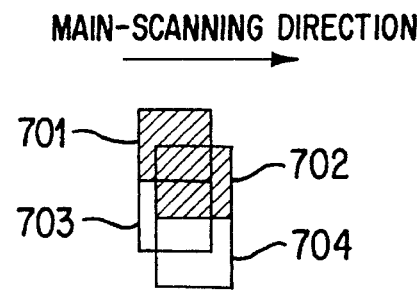
FIG.18(a)    FIG.18(b)
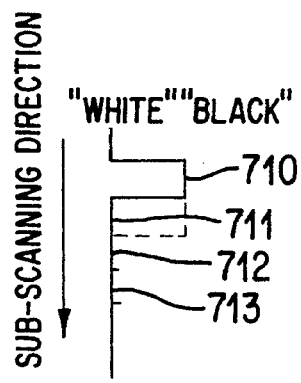
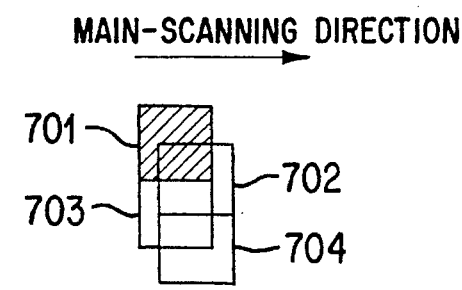
FIG.18(c)    FIG.18(d)
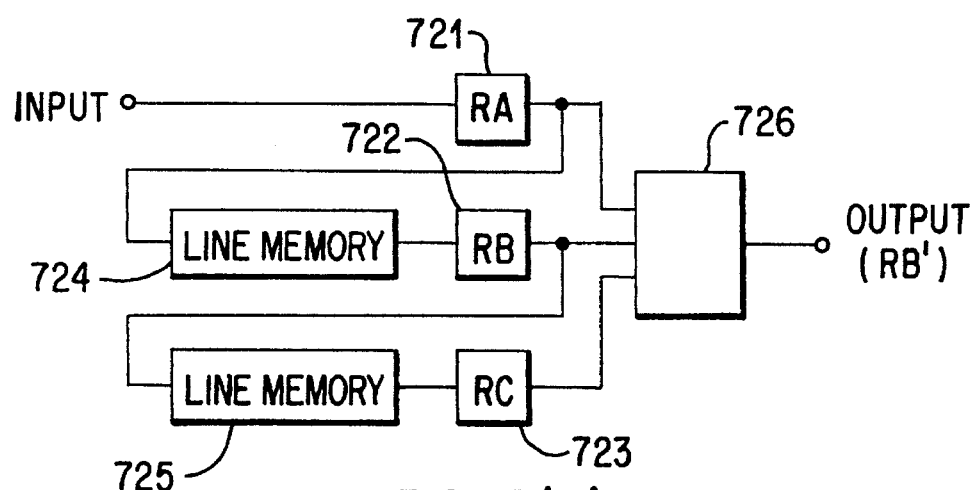
FIG.18(e)

METHOD, A DEVICE AND APPARATUS FOR PROCESSING VALUES CORRESPONDING TO MEASUREMENTS OF PIXELS, AND A FACSIMILE SYSTEM AND A DATA PROCESSING SYSTEM

This application is a continuation of application Ser. No. 07/714,350, filed 12 Jun. 1991 now abandoned, which is a continuation of Ser. No. 07/410,336 filed 20 Sep. 1989 now abandoned.

FIELD OF THE INVENTION

The present invention relates to the processing of values corresponding to measurements of pixels for improving the degree of resolution, as well as to a system, e.g. a facsimile system or a data processing system, including this improved processing.

BACKGROUND OF THE INVENTION

Many methods, devices, apparatus and systems for processing density information of a pixel of a document as well as their applications, for instance in a facsimile system or in a data processing system with a document scanner, have been proposed. A facsimile system is known which executes paper feeding in a predetermined direction called a sub-scanning direction, as described in the Japanese laid-open patent application no. 61-234170 and the Japanese laid-open patent application no. 63-288567. It is also known to increase the number of readings (number of lines) in the sub-scanning direction, as described in "NEFAX 6/60 Facsimile Transceiver", T. Sanpei et al, NEC Technical Report, Vol. 41, No. 9/1988 (page 60 to 62), and in "LSI Architecture of a Facsimile Video Signal Processor, M. Tadauchi et al, 1985 IEEE, 44.1.1–44.1.5 (page 1400–1404). In the facsimile device of the above mentioned prior art, an increased number of scan lines per mm is mentioned. Image processing wherein the resolution degree is improved, is not mentioned. A problem also occurs in that during reading of the succeeding lines, a gap easily occurs between those lines in the sub-scanning direction, so that density information is lost.

SUMMARY OF THE INVENTION

The present invention provides a high quality image by improving the degree of resolution in the predetermined direction by the use of an appropriate method and system for processing density information of a pixel. The present invention further provides a facsimile system and a data processing system which include this method and system for processing density information of a pixel resulting in a high quality image.

The present invention is defined in the claims.

Objects and features of the present invention will be apparent from the following detailed description of the preferred embodiments together with the accompanying drawings.

BRIEF DESCRIPTION OF THE DRAWINGS

FIGS. 10(a)–10(d) show examples of MTF correction coefficients.

FIGS. 18(a)–18(e) show an embodiment of a recording operation processing.

DETAILED DESCRIPTION

Figure 1:
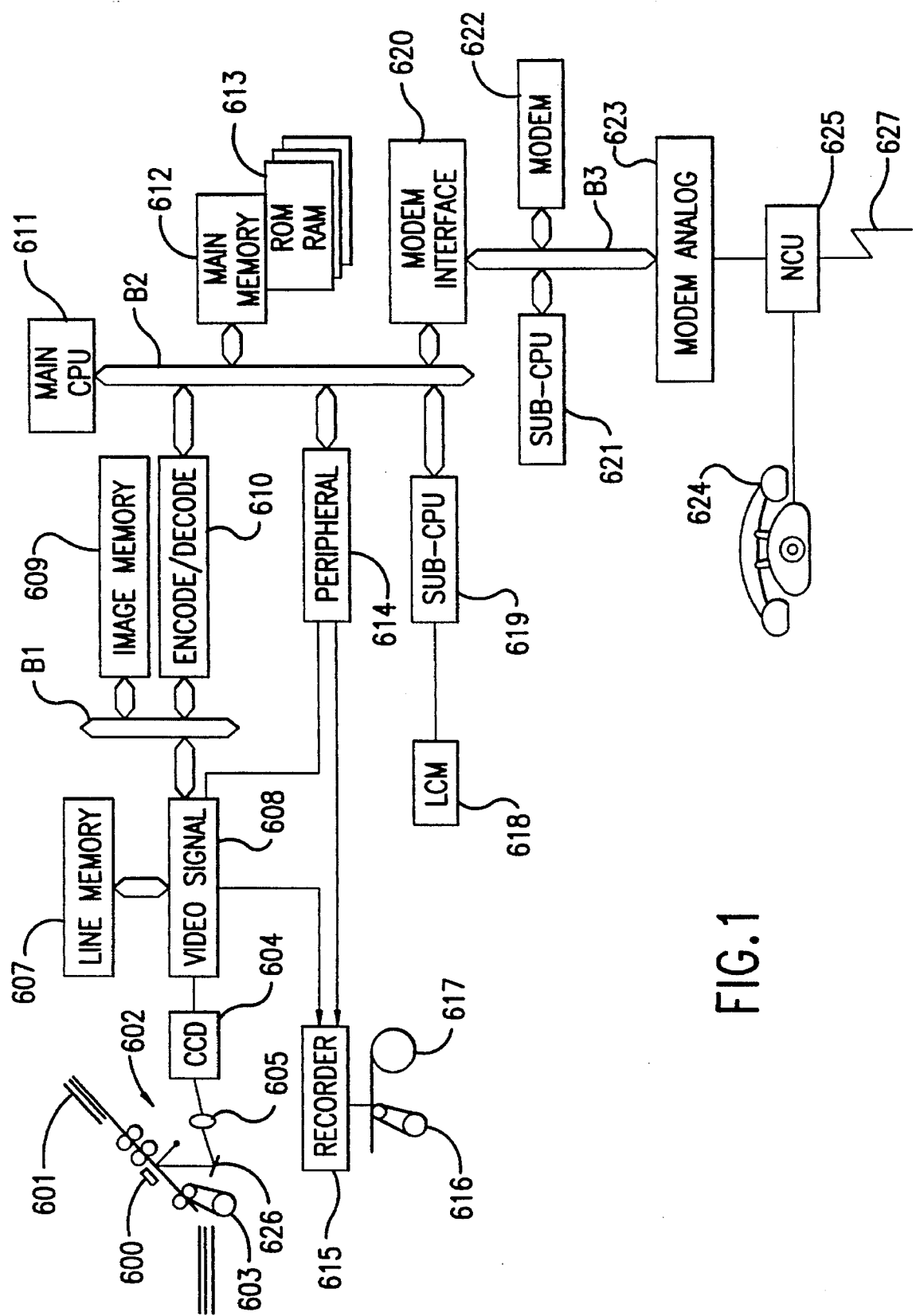
FIG. 1 shows an embodiment of a facsimile system.

FIG. 1 shows an embodiment of a facsimile system. An image sensor such as charge coupled device (CCD) 604 is used for document readers as sensing means for measuring the value of pixels on a document. CCD 604 includes a plurality of sensor elements in a main-scanning direction. A document 601 is provided with relative motion in the subscanning direction with respect to the CCD 604 over a predetermined pitch by a transmission motor 603. Light from a light source 602 is reflected by the document 601 or a white plate 600. Each of the sensor elements of the CCD 604 receives the optical signal consisting of the image information of each pixel of one line in a main-scanning direction of the document 601 or of the white plate 600, through a mirror 626 and a lens 605, and converts the optical signal into an electrical analog signal which represents the black-white density of each of the pixels. Each of the sensor elements of CCD 604 can receive the optical signal consisting of the image information of each pixel of a plurality of lines of the document at the same time, then the width in the subscanning direction of the pixel can be different from each line. This analog signal is converted into a distortionless digital signal which identifies the density of the pixel at the video signal processing means 608 with a line memory 607, which will be explained later in detail. Then, the digital signal is sent through an image bus B1, and is encoded and compressed into one of the CCITT's standard codes by the encode/decode means 610 with an image memory 609. The coded signal is transmitted to the communication line 627 through a system bus B2, a modem interface means 620, a modem 622, a modem analog means 623, a telephone control means 624, and an NCU (network control unit) 625.

The receiving mode operates in the opposite way. The facsimile system receives a coded signal from the communication line 627, then decodes and converts it into a digital image signal at the encode/decode means 610. The digital image signal is transferred to a recorder 615, such as for example a thermal printer, a laser printer or a liquid crystal printer, through the video signal processing means 608, and is printed on a recording material such as paper 617 driven by a receive motor 616. At least one part of the transmitted or received image signal can be displayed on the screen of a display device 618, such as a liquid crystal display device (LCM) or a cathod-ray tube device (CRT), by a sub-CPU 619. A main CPU 611 controls the entire system. A main memory 612 and ROM-RAM means 613 are connected to the system bus B2. A sub-CPU 621 controls the operation of modem interface means 620, modem 622 and modem analog means 623 through a bus B3. A peripheral control means 614 is connected to the video signal processing means 608, to the recorder 615 and to the system bus B2.

For a more detailed description of the facsimile system we refer to the document "A CMOS Facsimile Video Signal Processor", K. Nakashima et al, IEEE Journal of Solid-State Circuits, vol. SC-20, No. 6, December 1985, pages 1179–1183.

Figure 2:
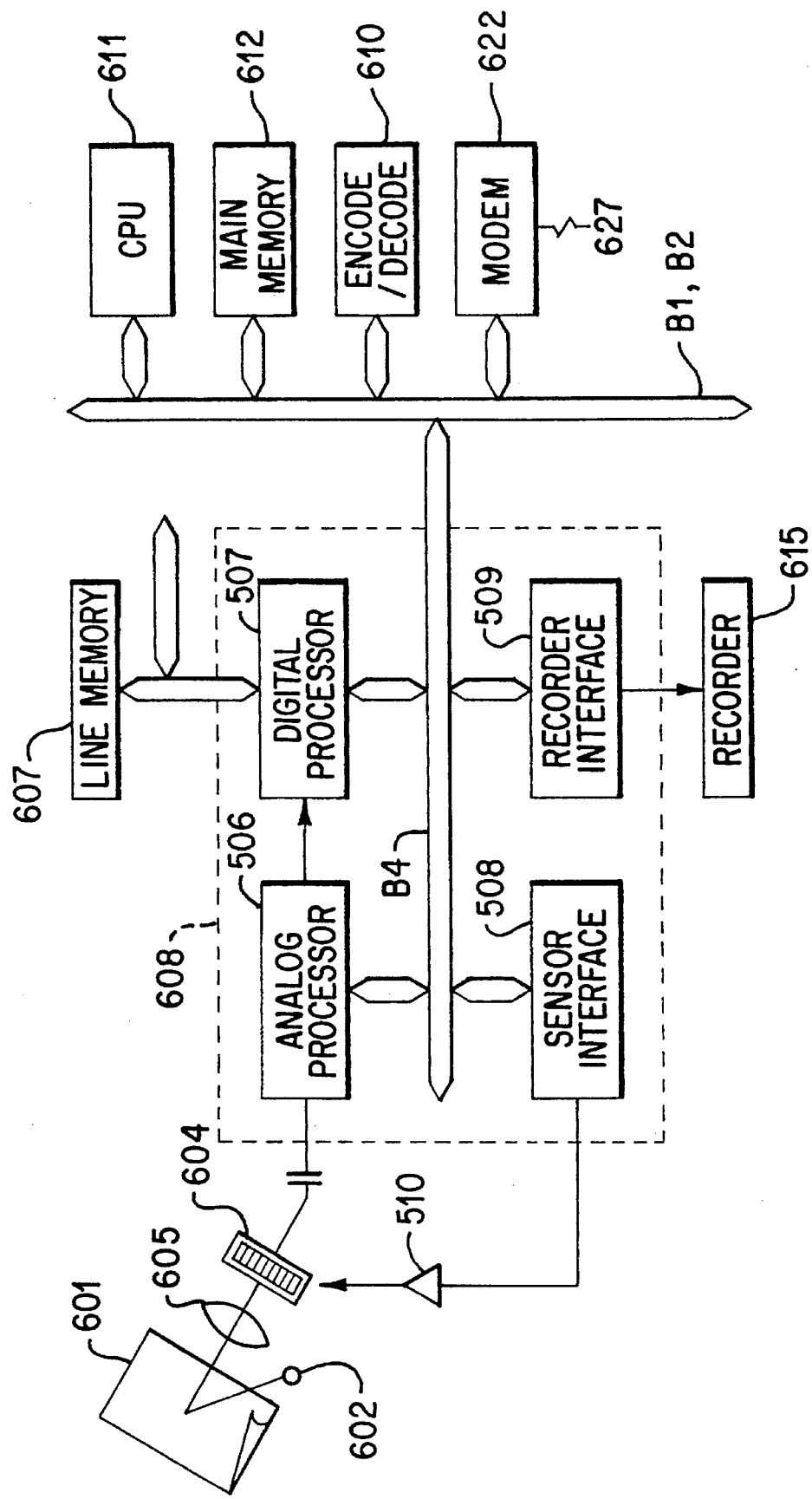
FIG. 2 shows an embodiment of the video signal processing means 608 of FIG. 1.

FIG. 2 shows an embodiment of the video signal processing means 608. The video signal processing means 608, enclosed by the dotted line, can be integrated in a semiconductor substrate and can be implemented as a one-chip LSI.

The video signal processing means 608 includes an analog processor 506, a digital processor 507, a sensor interface 508, a recorder interface 509 and an CPU interface (not shown in FIG. 2).

These blocks are connected to each other by an internal bus B4. In the transmitting mode, the sensor interface 508 drives the image sensor 604 through a driver 510. This sensor interface 508 is designed to be able to control various type image sensors. That is, the video signal processing means 608 can acquire image data synchronized with both internal generated clocks and external (generated by sensor 604) clocks. The CCD 604 scans the input document line by line electronically and converts the optical signal to an electrical analog signal. However, the input analog signal is distorted because of nonuniformity in the light-source illumination 602, optical characteristics of the lens 605, and the sensor's sensitivities. The main function of the analog processor 506 is to correct shading distortions to obtain an accurate output. After these corrections, the analog processor 506 converts the analog signals into serial digital signals. The digital processor 507 receives the digital signals, and converts them into parallel data for the CPU 611. Simultaneously, the digital processor 507 controls the sampling clock of the serial parallel conversion and improves the resolution of the signals.

In the receiving mode, the video signal processing means 608 receives the video signal from the encode/decode stage 610. After digital processing, serial data are transferred to the recording device 615.

A more detailed description of the analog processor 506, the sensor interface 508, the recorder interface 509 and the CPU interface can be found in the above-mentioned articles of K. Nakashima et al and of M. Tadauchi et al.

Figure 3:
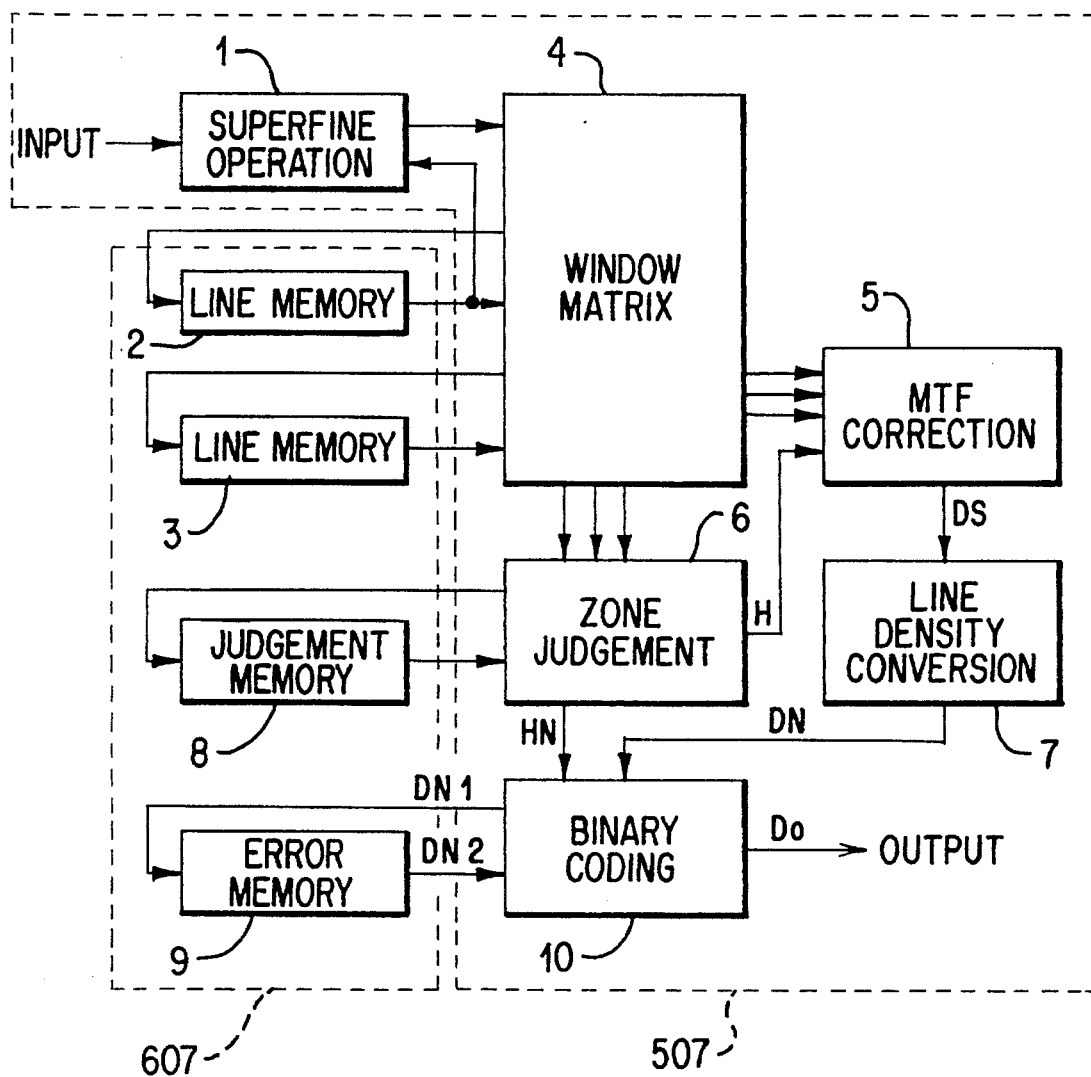
FIG. 3 shows the digital processor 507 of FIG. 2 according to a preferred embodiment of the present invention.

FIG. 3 represents the digital processor 507 and the line memory 607 according to a preferred embodiment of the present invention. The digital processor 507 and the line memory 607 are provided with a superfine operation means 1, a window matrix 4, two line memories 2 and 3 provided in the above window matrix 4, a Modulation Transfer Function (hereafter referred to as MTF) correction means 5, a zone judgement means 6, a judgement result memory 8 connected to the judgement means 6, a line density conversion means 7, a binary coding means 10, and an error memory 9 connected to the binary coding means 10. The operation means 1, the matrix 4, the means 5 to 7 and 10 can be integrated in a semiconductor substrate and can be implemented as a one-chip LSI.

The superfine operation means 1 receives a digital signal from the analog processor 506 and an output signal from the line memory 2 and outputs a signal to the window matrix 4. The window matrix 4 outputs data to the line memory 2 and the line memory 3 and receives data from each of the line memories 2 and 3. In other words, the data for three lines (from 1, 2 and 3) are stored in the window state of the window matrix 4. MTF correction operation processing in the MTF correction means 5, and judgement processing in the binary coding zone or halftone zone in the zone judgement means 6 are carried out based on the value stored in the window matrix 4, details of which are described later. The judgement results H and HN of this zone judgement means 6 are sent to the MTF correction means 5 and to the binary coding means 10, respectively, and the respective processing parameters are controlled. An output DS of the MTF correction means 5 is converted to line density by the line density conversion means 7 and then binarized by the binary coding means 10 to be finally outputted as Do to the image bus B1, or the system bus B2.

Figure 4:
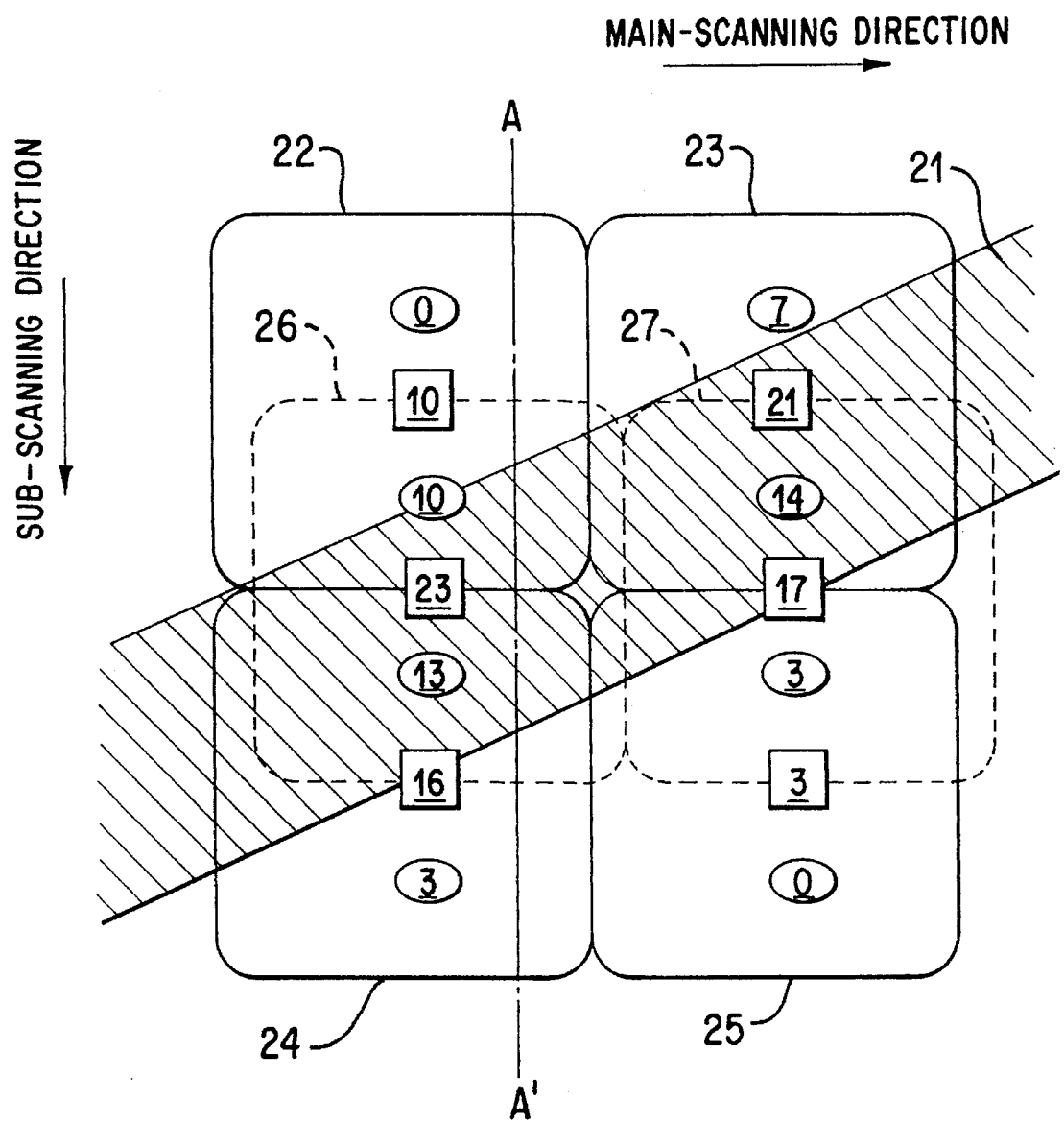
FIG. 4 shows an embodiment of superfine operation processing performed by element 1 of FIG. 3.

FIG. 4 explains the superfine operation processing. A fine line (represented by the hatched part) 21 is written on a document. In FIG. 4, only two sensor elements of the CCD 604 are illustrated. Other sensor elements, provided in the main-scanning direction, are not illustrated in FIG. 4. The main-scanning direction is substantially perpendicular to the sub-scanning direction. Each sensor element of the CCD 604 receives an optical signal reflected by the document. The shape of each sensor element is for instance a square, a rectangular, a circle, a triangle, and so forth. Two sensor elements of the CCD 604 receive an optical signal which identifies the image information of pixels 22 and 23 of the first line 21 in the main-scanning direction, and convert the optical signal to an electric signal including the primary density information which is, for example, "10" at pixel 22 and "21" at pixel 23. In the case of conventional line feeding, the position of the sensor elements and the documents is then moved relatively in the sub-scanning direction to the pixels 24 and 25 of the document. In the preferred embodiment of the present invention, however, overlapping of the succeeding sensed lines (portions of lines) is provided. Namely, in the preferred embodiment of the present invention, it is in the second line moved relatively in the sub-scanning direction to the pixels 26 and 27 (represented by dotted lines), overlapping the pixels 22 and 23 by half. In other words, image on the document moves relatively by the pitch of ½ of the pixels 22, 23, 24, 25, 26, 27 in the direction opposite to the sub-scanning direction. So there is no gap in the sub-scanning direction because of overlapping. In FIG. 4, pixels 26, 27 are represented having a gap in the main-scanning direction with regard to the pixels 22, 23, 24, 25 for facilitating the explanation (can otherwise not be distinguished from the full lines). There is no such gap in the embodiment. In another embodiment, such a gap can be in the main-scanning direction shown in FIG. 4.

Suppose the primary density (or brightness) information is, for example, "23" at pixel 26 and "17" at pixel 27, in the second line "16" at pixel 24, and "3" at pixel 25 in the third line.

The pixels 26 and 27 overlap the pixels 22, 24 and 23, 25, respectively, by one half of a pixel, and it is possible by means of a calculation to separate them into each of these halves. Indeed, if the secondary density information of the upper half of each of the pixels 22 and 23 are previously calculated, the secondary density information of their lower half can be calculated, too. For example, the previously calculated secondary density information of the upper half of the pixels 22 and 23 is "0" and "7", respectively, and the primary density information at the lower half of the pixels 22 and 23, respectively, "10" and "21", respectively, as mentioned above. The secondary density information of their respective lower half is calculated as follows.

"10"–"0"="10"

for pixel 22, and

"21"–"7"="14"

for pixel 23, the values "10" and "14" obtained in this way represent the secondary density information of the lower half of the pixels 22 and 23, respectively. The secondary density information of half the size of the pixels can be obtained by proceeding with the calculation in the same manner.

Here, the question is how to know the density of the upper half of the first pixel, in other words, the initial primary and secondary density information. A blank white plate (600 in FIG. 1) scanning can be carried out before inputting a document, and a scanning for correcting shading wave form distortion in an optical system is executed in the analog processor 506 as mentioned above. Therefore, if the operation is started from this point, it can be started from the initial primary density information and initial secondary density information "0" without fail. This way, the problem of calculating the initial value can be solved.

Figure 5:
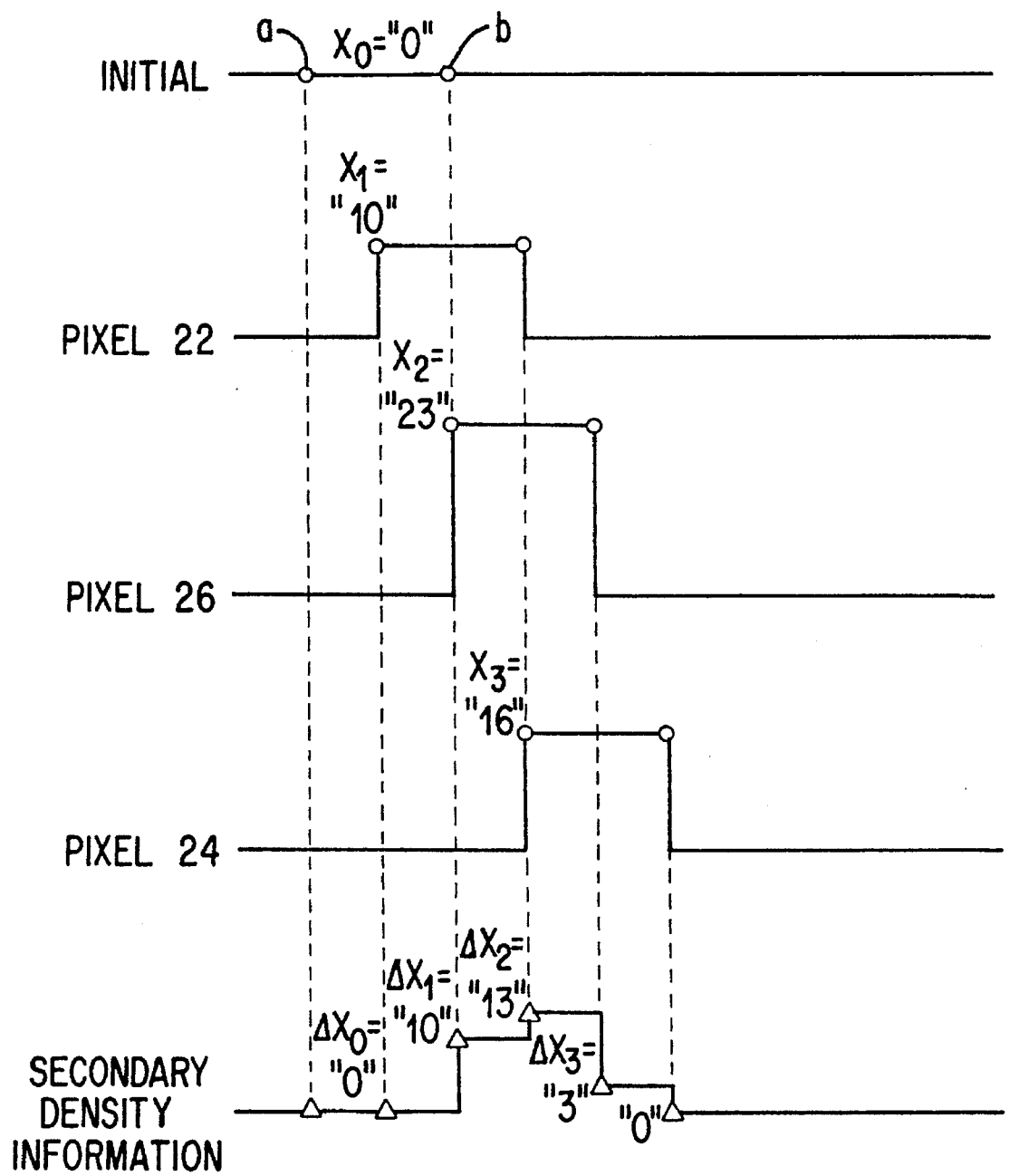
FIG. 5 shows a time chart illustrating a change in the density information along line A—A' in FIG. 4.

FIG. 5 is a time chart illustrating the change in density information along line A—A' in FIG. 4. The axis of the abscissa is the sub-scanning direction and the axis of the ordinate is the primary, and secondary density information. The width of the pixel is represented by the distance between points a and b in FIG. 5. If the primary density information $X_1$, $X_2$, $X_3$, respectively, at the pixels 22, 26 and 24 is "10", "23" and "16", respectively, and the initial primary density information $X_0$ and initial secondary density, information $\Delta X_0$ are "0" as mentioned above, the secondary density information $\Delta X_0$, $\Delta X_1$, $\Delta X_2$, $\Delta X_3$ from the superfine operation processing of this preferred embodiment is in the stepwise state (half a pitch, i.e. half a pixel) changing from "0"–"10"–"13"–"3" as shown at the bottom of FIG. 5, wherein $\Delta X_0 = X_0 = $ "0"

$\Delta X_1 = X_1 - \Delta X_0 = $ "10"–"0"="10"

$\Delta X_2 = X_2 - \Delta X_1 = $ "23"–"10"="13"

$\Delta X_3 = X_3 - \Delta X_2 = $ "16"–"13"="3"

It is now known how the secondary density information is changing for each half of the width of the pixel in the sub-scanning direction and the degree of resolution in the sub-scanning direction is doubled, although size of pixel is unchanged.

Figure 6:
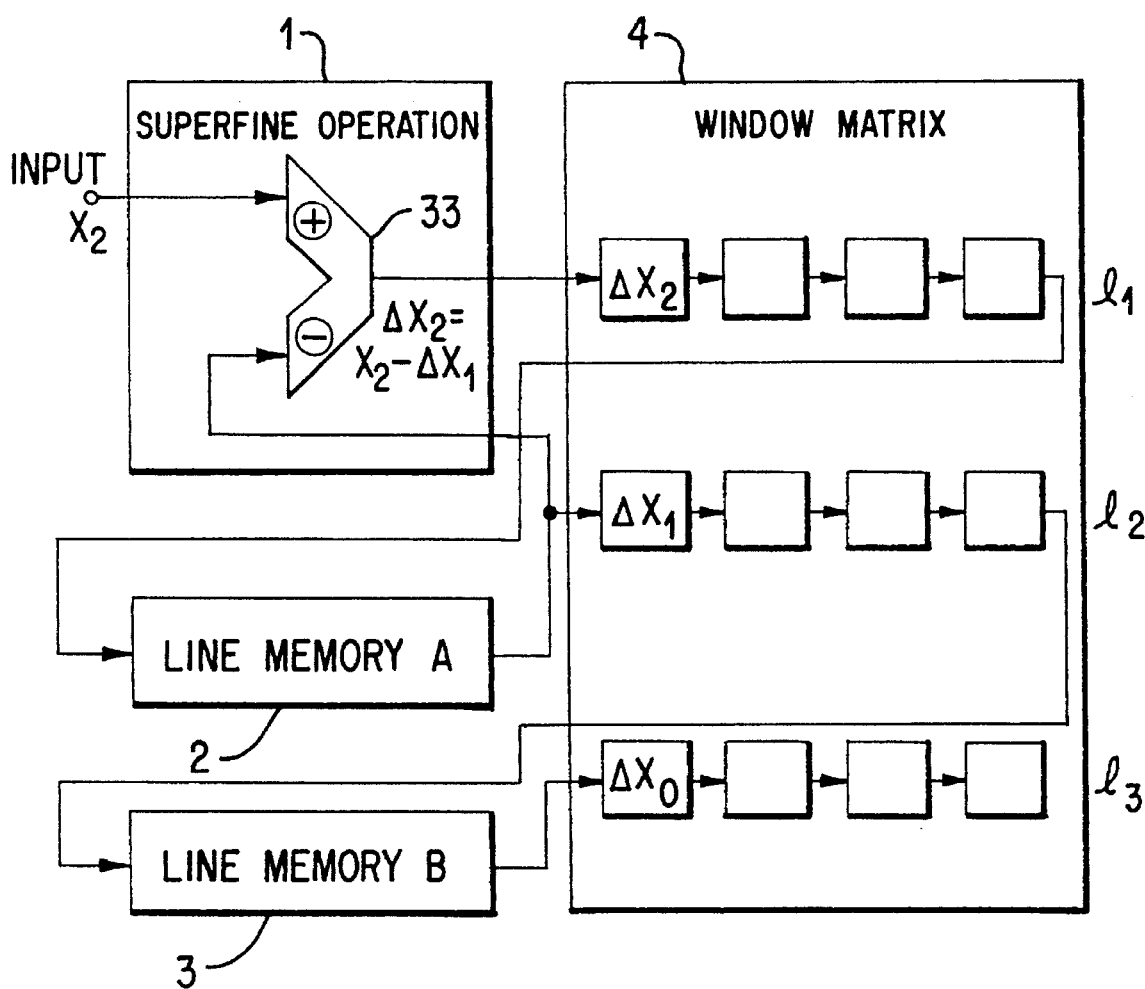
FIG. 6 shows an embodiment of the superfine operation means 1 and the window matrix 4 of FIG. 3.

FIG. 6 shows the superfine operation means and the window matrix 4. In this preferred embodiment, the superfine operation means 1 is basically constituted by a subtractor 33 for calculating the secondary density information $\Delta X_j$ (j: integer). The window matrix 4 comprises, for example, a 4×3 matrix register, there are 3 lines $l_1$, $l_2$, $l_3$ and each line has four memories connected in series forming a shift register wherein four secondary density information values in the main-scanning direction can be stored. Line $l_1$ and line $l_2$ are connected in series through line memory A(2), and lines $l_2$ and $l_3$ are connected in series through the line memory B(3). The substractor 33 receives the primary density information (ex $X_2$) and the output of the line memory A(2) (ex. $\Delta X_1$). An output of substractor 33 is connected to the window matrix 4. The secondary density information is sent from the window matrix 4 to the line memory 2, and the contents of the line memory 2, that is, data of the previously calculated line in the sub-scanning direction, is, after the operation, fed back to the superfine operation means 1 again and secondary density information of the overlapped pixel (e.g $\Delta X_1$) is subtracted from the input digital data (e.g. $X_2$). Incidentally, this superfine operation is carried out when transmitting a binary code (monotone) or halftone.

Figure 7:
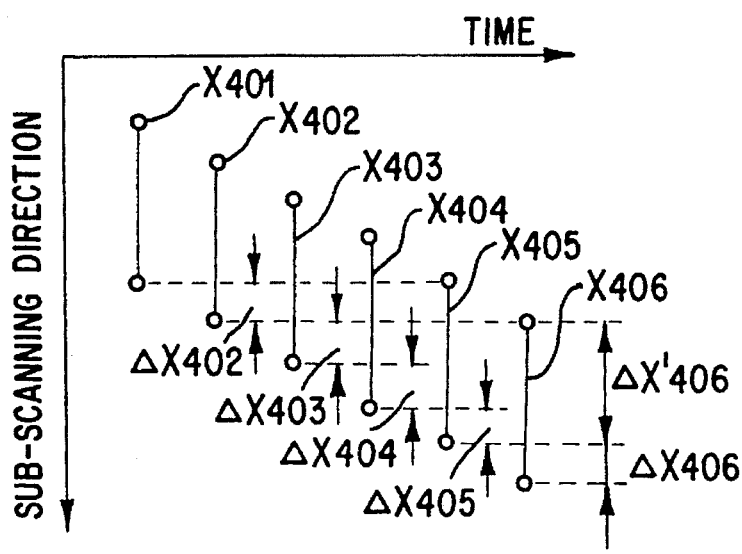
FIG. 7 shows another embodiment of the superfine operation processing.

FIG. 7 explains another superfine operation of the present invention. The axis of the abscissa is the sub-scanning direction and the axis of the ordinate is time. In this preferred embodiment, the superfine operation is proceeded not with a pitch which is half of the usual pitch but one which is a fourth of it. However, the preferred embodiment can be applied to a case where the pitch is the reciprocal of any natural number.

Segments 401 to 406 in FIG. 7 show the pixels in the sub-scanning direction in a specific time. That is, each reading pixel is advanced with an overlap of three fourths. Taking an example of the pixel 406, if the primary density information ($X_{406}$) of the pixel 406 and the density information ($\Delta X'_{406}$) of the overlap part, constituted by the overlapping of pixel 406 and the previous pixel 405 or the previously calculated secondary density information $\Delta X_{402}$, $\Delta X_{403}$, $\Delta X_{404}$, $\Delta X_{405}$, which are known. A pixel density information $\Delta X_{406}$ of the part of the pixel 406 which does not overlap the previous pixel 405 can be given by one of the following formulas.

$$\begin{aligned} \Delta X_{406} &= X_{406} - \Delta X_{406}' \\ &= X_{406} - (X_{405} - \Delta X_{402}) \\ &= X_{406} - (\Delta X_{405} + \Delta X_{404} + \Delta X_{403}) \end{aligned}$$

Figure 8:
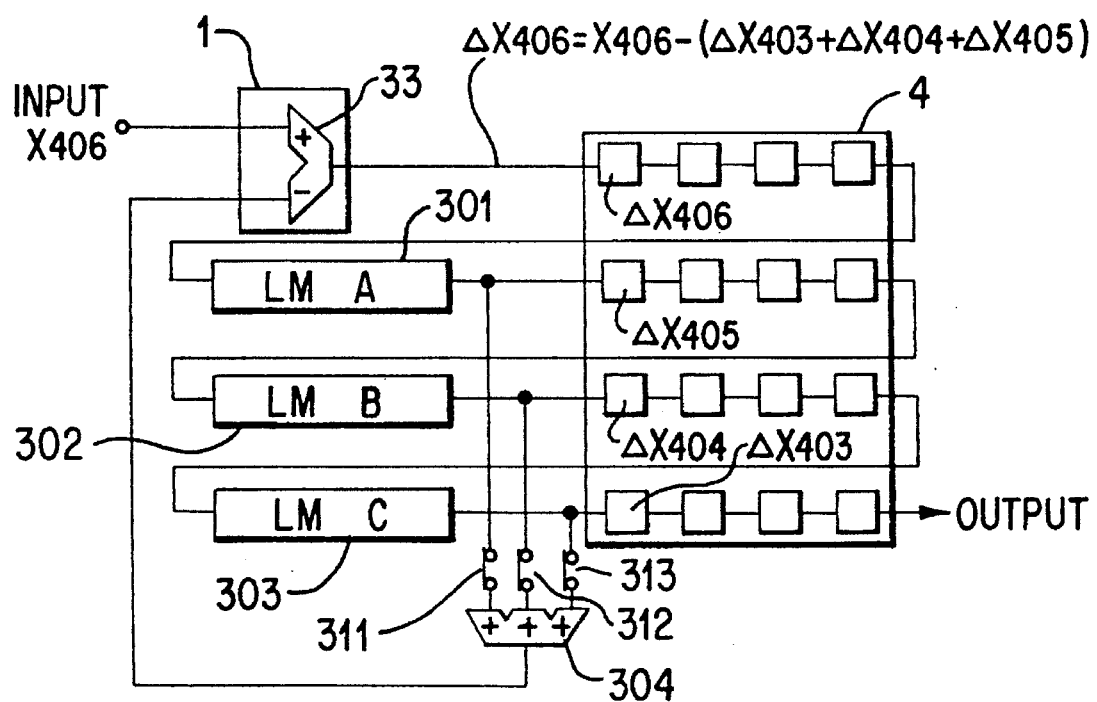
FIG. 8 shows another embodiment of the superfine operation means 1 and the window matrix 4 of FIG. 3.

It is possible to operate with a density of one fourth of the pixel as a secondary density information at any position. The initial value is determined as mentioned above. The main part of the example in which the above explanation is made into hardware is shown in FIG. 8. Its basic constitution is the same as that shown in FIG. 6 but is different in that three line memories 301 to 303 are used, the number of the window matrix is increased to a 4×4 matrix register and an adder 304 for adding the output of the line memories 301 to 303 and switches 311 to 313, which can be MOS-FETS, are provided. In FIG. 8, all of switches 311, 312, 313 are in the ON state.

Generally, the jth (j=integer) secondary density information ($\Delta X_j$) representing the density information of the part of the jth pixel which does not overlap the (j−1)th pixel can be calculated on the basis of at least the jth primary density information ($X_j$) and of the jth overlap density information representing the density information of the overlap part of the jth pixel which overlaps the (j−1)th pixel. In other words, the jth secondary density information ($\Delta X_j$) can be calculated on the basis of the jth density information ($X_j$) and at least the previously calculated secondary density information. If the document and CCD 604 move relatively by the pitch of the n fraction (n≧2, n: integer) of the width of a pixel (in other words, the width of the jth non-overlapping part can be the n fraction of the width of the jth pixel, or can be (n−1) fraction of the width of the jth overlapping part in the sub-scanning), the jth secondary density information ($\Delta X_j$) is given by the following formula $$\Delta X_j = X_j - (\alpha_{j-1} \cdot X_{j-1} - \alpha_{j-1} \cdot \Delta X_{j-n})$$

or $$\Delta X_j = X_j - \sum_{k=j-n+1}^{j-1} \alpha_k \cdot \Delta X_k$$

wherein $\alpha_k$, $\alpha_{j-1}$, $\alpha_{j-n}$ designate a predetermined correction coefficient depending on the sensor's sensitivities, the distance between the jth pixel and the kth pixel, the j−1th pixel and the j−nth pixel, and so forth. If the distance is short, $\alpha_k$, $\alpha_{j-1}$, $\alpha_{j-n}$ are relatively big, and if the distance is long, they are relatively small. n is the ratio of the width in the sub-scanning direction of the part of the jth portion which does not overlap the (j−1)th portion towards the width in the sub-scanning direction of the jth portion. In the embodiment shown in FIGS. 4 to 6, n=2 and $\alpha_k \approx \alpha_{j-1} \approx \alpha_{j-n} \approx 1$. In the embodiment shown in FIGS. 7 and 8, n=4 and $\alpha_k \approx \alpha_{j-1} \approx \alpha_{j-n} \approx 1$.

It is possible to provide a superfine mode designating means such as the switches 311, 312, 313 so that the user can select high visual quality to select the switches 311, 312, 313 which also determines the pitch. For instance, in FIG. 8, if the user selects the condition of n=4 through an input means such as a keyboard (not illustrated in FIG. 8), all of the switches 311, 312, 313 are in the ON state and the pitch is set the fourth of the usual pitch as mentioned above. If the user selects to be a condition of n=3, the switches 311 and 312 are in the ON state, the switch 313 is in the OFF state, and the pitch is set to be a third of the usual pitch. If the user selects the condition of n=2, the switch 311 is in the ON state, switches 312, 313 are in the OFF state, and the pitch is set to half of usual pitch as mentioned in FIGS. 4, 5, 6. If the user selects the condition of n=1, all of the switches 311, 312, 313 are in the OFF state, and the pitch is set to a usual pitch as in a conventional system.

Thus, in accordance with preferred embodiments of this invention, increased resolution of superfine operation is made possible, although the actual pixel size is unchanged. The resolution is thus greater than that simply determined by pixel size. In other words, the preferred embodiments provide a substantially higher number of density information words, preferably a multiple of density information words, in comparison to the number of non-overlapping pixels constituting the image.

Figure 9:
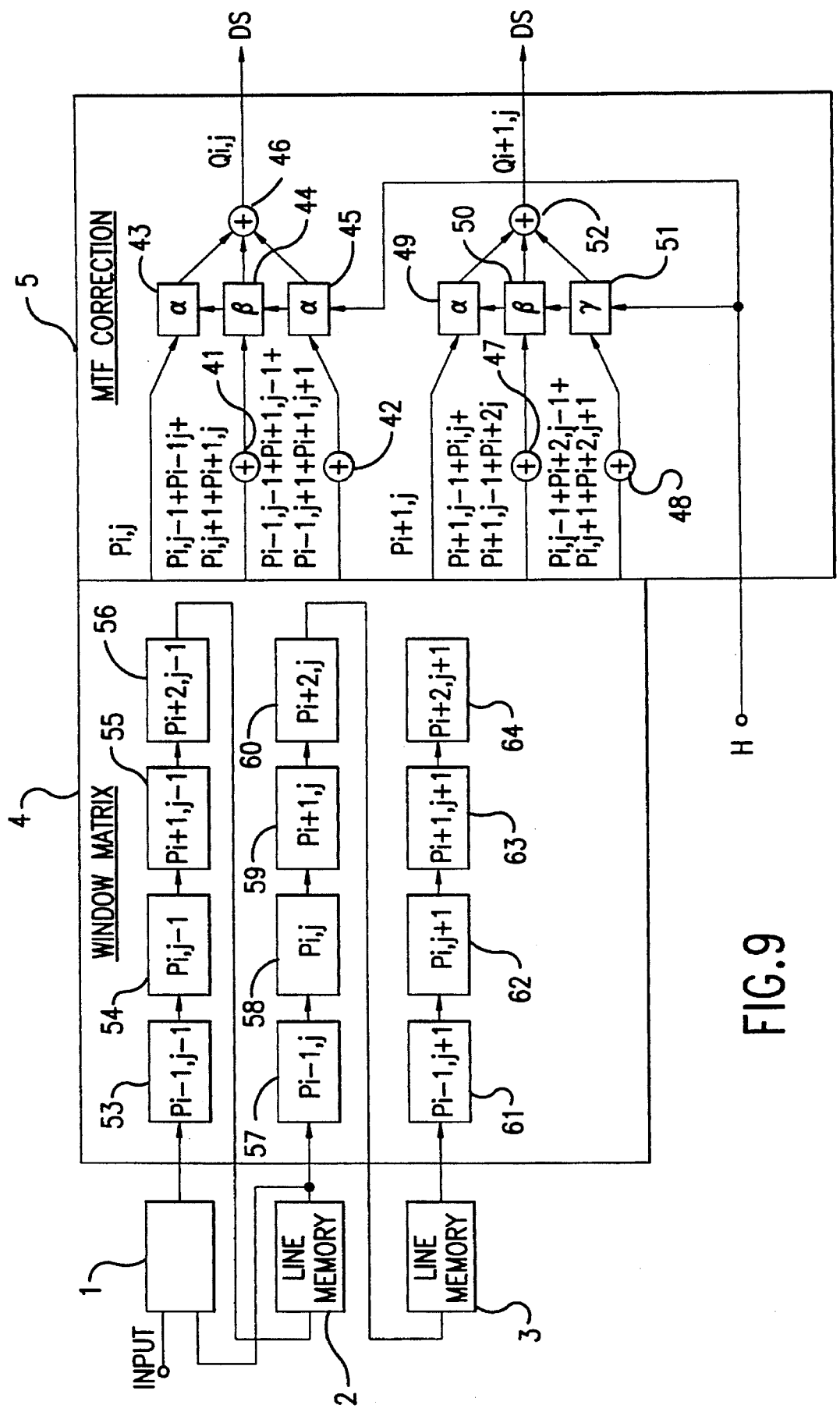
FIG. 9 shows an embodiment of the superfine operation means 1 and MTF correction means 5 of FIG. 3.

FIG. 9 shows the window matrix 4 and the MTF correction means 5. In the MTF correction means 5, an MTF correction value $Q_{i,j}$ (i: number in main-scanning direction, j: number in sub-scanning direction) is obtained by taking out, with centering secondary density information Pi, j (58) above, below, right and left of it, with Pi, j−1 (54), Pi, j+1 (62), Pi−1, j (57) and Pi+1, j (59) and with diagonally adjacent windows Pi−1, j−1 (53), Pi+1, j−1 (55), Pi−1, j+1 (61) and Pi+1, j+1 (63) from each of the secondary density information of the window matrix 4. This operation is carried out by the following arithmetic expression.

$$Q_{i,j} = \alpha Pi, j + \beta(Pi, j-1 + Pi-1, j + Pi, j+1 + Pi+1, j) + \gamma(Pi-1, j-1 + Pi+1, j-1 + Pi-1, j+1 + Pi+1, j+1)$$

This operation can be carried out by the multipliers 43, 44 and 45 and adders 41, 42 and 46.

Furthermore, the MTF correction value Qi+1, j is obtained simultaneously by the following arithmetic expression:

$$Qi+1, j = \alpha Pi+1, j + \beta(Pi+1, j-1 + Pi, j + Pi+1, j+1 + Pi+2, j) + \gamma(Pi, j-1 + Pi+2, j-1 + Pi, j+1 + Pi+2, j+1)$$

This operation can be carried out by the multipliers 49, 50 and 51 and adders 47, 48 and 52.

High speed processing can be carried out by storing the above arithmetic expressions in a table and taking out this table without using hardware such as multipliers and adders.

Incidentally, at the MTF correction means 5 shown in FIG. 9, two pairs of MTF operations are carried out simultaneously in one window matrix 4 and two secondary density, information are simultaneously processed to improve the processing speed.

In this preferred embodiment, the secondary density information 53 to 64 of the window matrix 4 are used not only for the MTF correction operation but also for the superfine operation as mentioned above. Hardware can be saved in this way.

In this preferred embodiment, the values of coefficients $\alpha$, $\beta$ and $\gamma$ used in the MTF correction operation are changed by the zone judgment result H from the zone judgment means 6. Examples of the MTF correction coefficients are shown in FIG. 10. In these examples, the total of each coefficient basically equals "1" to make the input density and the density after processing equal to each other. All coefficients $\alpha$, $\beta$ and $\gamma$ are used in (a) and (b) in FIG. 10. In (c) and (d), the coefficient $\gamma$ is made "0" and only the coefficients $\alpha$ and $\beta$ are used. How to decide the coefficients $\alpha$, $\beta$ and $\gamma$ from the zone judgment result H depends on what kind of MTF correction is chosen.

For example, control in which correction is emphasized for the letters of a manuscript and not for photograph may be carried out. Correction is emphasized in (a) and (c) of FIG. 10 and is not emphasized in (b) and (d), as mentioned in the articles "Enhancement of Blurred Image by a Real Time MTF Reconstruction Circuit" K. Ejiri et al, Ricoh Technical Reort No. 6. Nov. 1981, pp 37–42.

Incidentally, if the density value exceeds a prescribed maximum value (overflow) or falls under a prescribed minimum value (underflow) as a result of the MTF correction operation, the operation is carried out again using another MTF correction coefficient to execute MTF correction for maintaining the correct density since the relationship of density between input and output cannot be maintained. In addition, in case of overflow or underflow, input and output density values can be held constant by storing the overflow part or the underflow part, and by considering this overflow part or underflow part in the MTF correction operation for the second time. Moreover, the values of the coefficient of the pixel adjoining above and below and to the right and left, or the coefficient of the picture elements adjoining diagonally are the same as those in the examples of FIG. 10, but they can be changed based on the actual MTF value (test value by the actual facsimile device).

Figure 11:
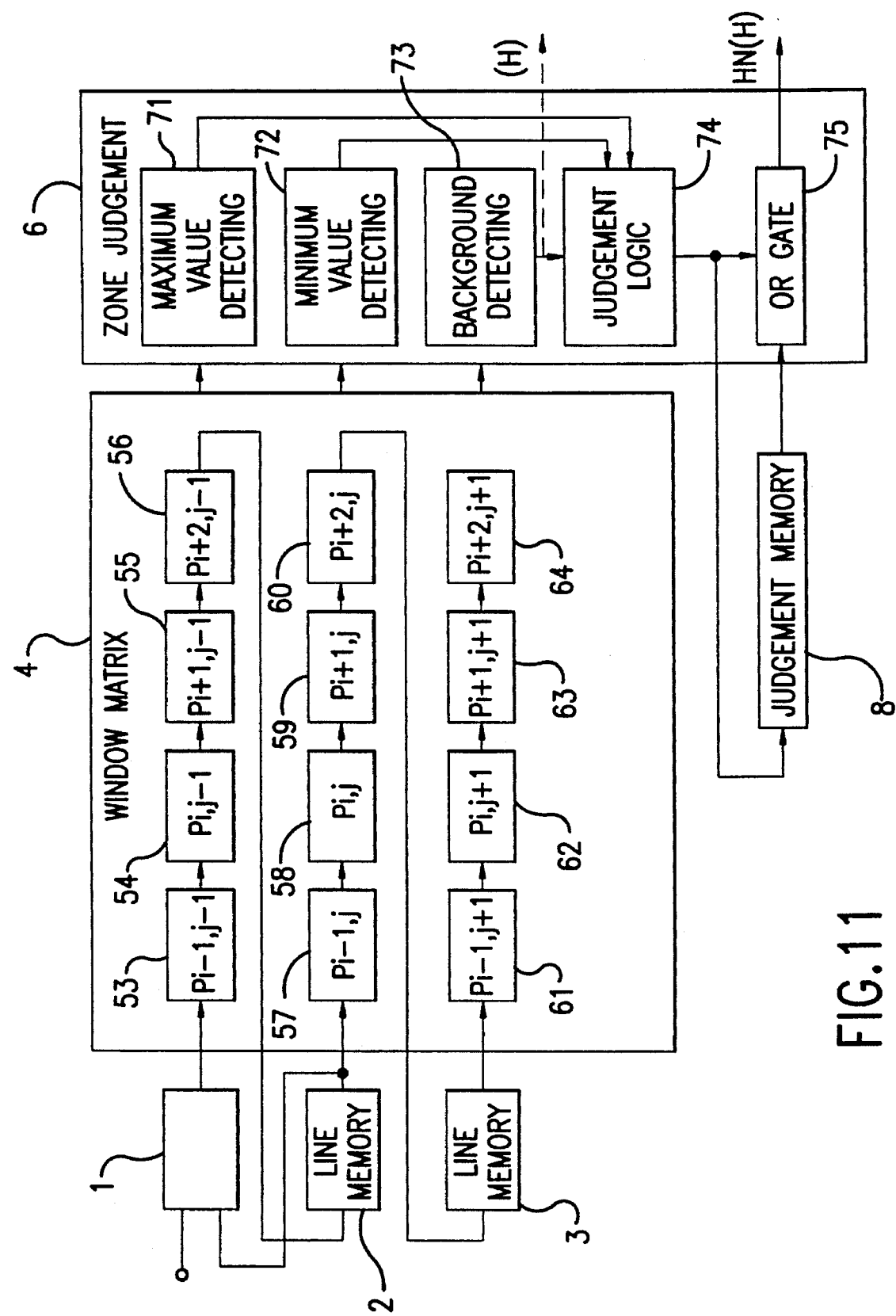
FIG. 11 shows an embodiment of the zone judgement part 6 of FIG. 3.
Figure 12A:
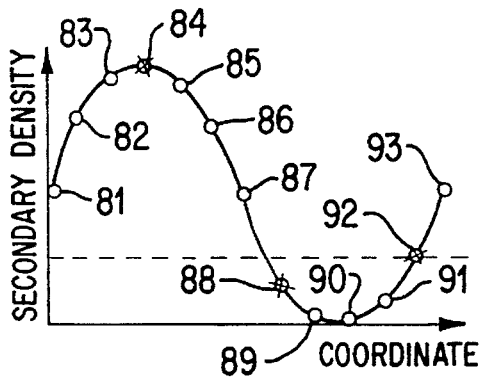
FIGS. 12(a)–12(d) show embodiments of the line density conversion operation processing performed by element 7 of FIG. 3.
Figure 12B:
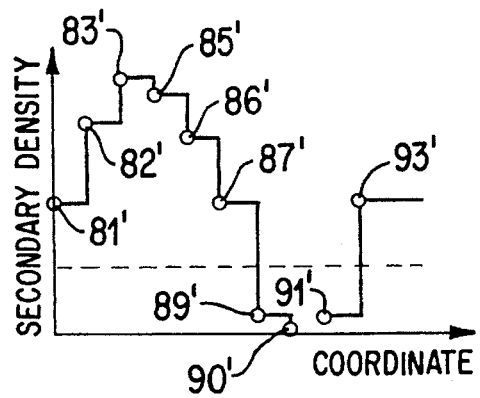
Figure 12C:
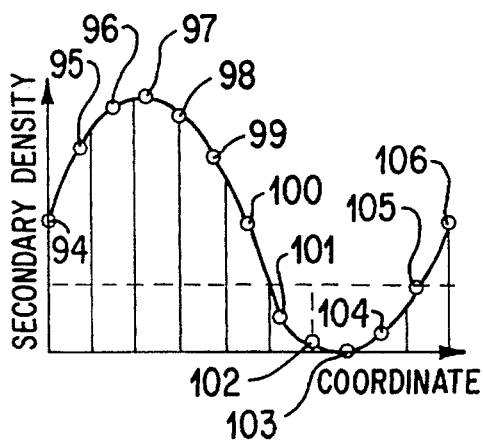
Figure 12D:
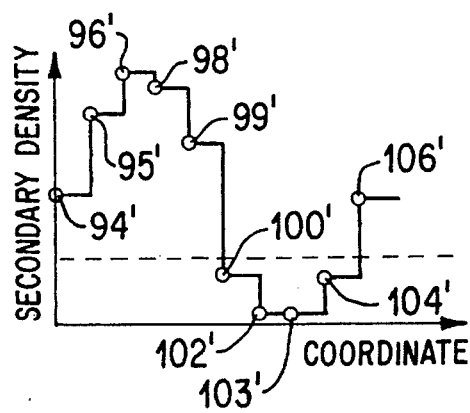

FIG. 11 shows an embodiment of the zone judgment means 6. The zone judgment means 6 is provided with a maximum value detecting means 71, a minimum detecting means 72, a background detecting means 73, a judgment logic means 74 and a judgment result OR gate 75, which takes the OR of the output of the judgment logic means 74 with the previous output of the judgment logic means 74. In this zone judgment means 6, the background detecting means 73 detects a background density value (for example, a background density value of the Ozalid part of an Ozalid document, the maximum value detecting means 71 and the minimum detecting means 72 detect the maximum density value and the minimum density value, respectively, of what has to be read such as letters, photographs, and figures on the document, and the judgment logic means 74 judges the binary coding zone-like letters or the halftone zone-like photographs based on these detected values. This judgment result is stored in the memory 8 as the primary judgment value and the result of OR 75 for the judgment result at the next line and the above primary judgment value is outputted as the secondary judgment value HN. Incidentally, this output value HN or the detected value of the background detecting part 73 can be used as the above-mentioned judgment result H of the zone judgment means 6.

A characteristic of this preferred embodiment is that the number of secondary density information values to be stored in the main-scanning direction of the window matrix 4 is bigger than the number of secondary density information values to be stored in the sub-scanning direction. This is because the number of secondary density information values to be stored in the main-scanning direction can be increased only by adding a register to the window matrix 4, and the sub-scanning direction can be extended equally by an OR operation, the judgment result being compared with that of a new line memory (another line memory besides the line memories 2 and 3) are required to extend the secondary density information to be stored in the sub-scanning direction, which remarkably increases the quantity of hardware involved.

Another characteristic is that the judgment is made not only for the difference between the maximum value and the minimum value, but also using the background detected value as a standard for the judgment. This background detection is used for judging and processing a background that is entirely white, entirely black or entirely grey as a binary coding zone by calculating the average density.

Incidentally, judgment by the judgment logic means 74 is made by comparing a certain threshold value and a detected value, but the binary coding zone and the halftone zone can be designated by a user by enabling this threshold value determined by the user.

For a more detailed description of the zone judgment means 6 we refer to the Japanese laid-open patent application no. 61-234170.

A summary of the processing for the line density conversion means 7 is explained referring to FIG. 12. FIG. 12(*a*) shows the concept for a conventional line density conversion. Plots 81 through 93 in FIG. 12(*a*) indicate the input values of the secondary density information. This example shows a reduction conversion by three fourths and points 84, 88 and 92 with cross marks on the plots are eliminated. In this eliminating operation, various methods, which not only eliminate but do so by taking into account the situation of peripheral pixels, are proposed under the present conditions. Among them, FIG. 12(*b*) shows an example in which density is determined by taking an average of the eliminated secondary density information and the next secondary density information. Plots 81' to 83' are of the same density as the input, but an average density of the plots 84 and 85 of input is set as an output density value of a plot 85'. It also applies to plots 89' and 93'. However, as operations are carried out only when elimination is generated in this method, undesirable patterns which were not in the original pixel can be generated depending on the combination of the space frequency of the input document, and the rate of enlargement or reduction.

In the line density conversion means 7 of this preferred embodiment, interpolation processing is carried out by executing the operation using multivalue data for each secondary density information. FIG. 12(*c*) shows as example of three fourths reduction as in FIG. 12(*a*). Secondary density information to be eliminated are not set here, but coordinate conversion as shown by a vertical line is carried out and the density at the above point is decided by the adjacent two dot pixels. This decision is made by a rectilinear distribution according to the distance from the above two dot pixels. Incidentally, it is possible to carry it out a through curvilinear assumption by increasing the number of reference points FIG. 12(*d*) shows the density change after conversion. The difference from the conventional method cannot be known from the explanatory diagram of this FIG. 12, but as the reduction processing operation is carried out for each pixel in the processing method of this preferred embodiment, stable processing is possible, and it has the effect that the generation of undesirable patterns which occurred in the past is drastically reduced.

Figure 13:
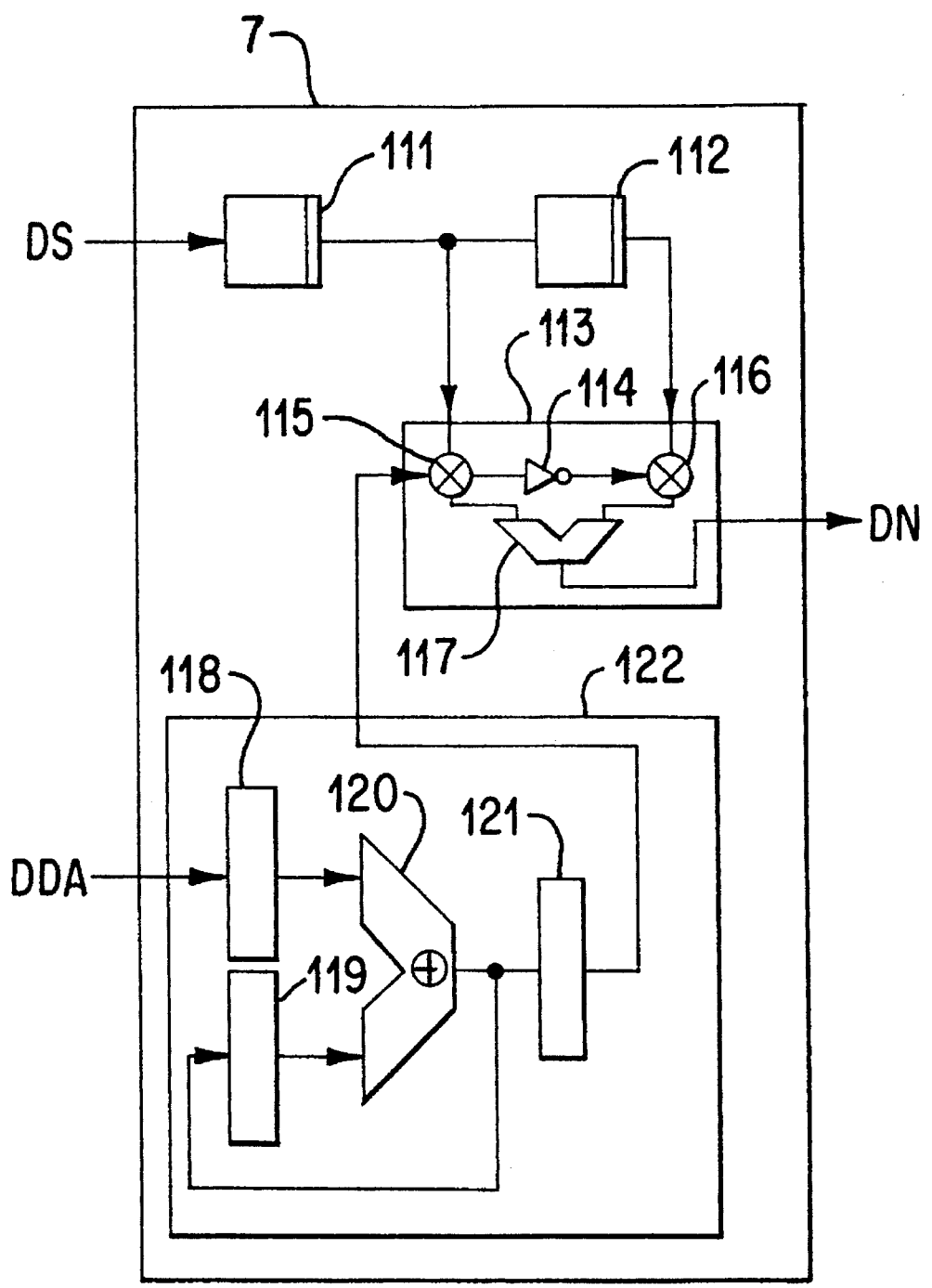
FIG. 13 shows an embodiment of the line density conversion part 7 of FIG. 3.

FIG. 13 shows the line density conversion means 7 of this preferred embodiment. An output DS of the MTFF correction means 5 is latched to a register 111 and then to a register 112 delayed for part of one pixel. The density values stored in these two registers 111 and 112 are processed in an interpolation means 113 to obtain the output DN. In the interpolation means 113, the contents (density value) of register 111 and register 112 are multiplied by coefficients in multipliers 115 and 116 respectively, and an operation to add both the values is carried out in an adder 117. The coefficient at the multiplier 115 is determined in an interpolation coordinate operation part 122 by an operation where the interpolation position is located between the two reference pixels. The coefficient of the multiplier 116 is obtained by subtracting the coefficient value of the multiplier 116 from the complement of the coefficient value of the multiplier 115, namely, the value "1". This operation is carried out by an inverter 114.

The interpolation coordinate operation part 122 comprises a register 118 in which the conversion rate DDA is set, a register 119 and an adder 120 which adds the contents of both the registers 118 and 119 and outputs them to the register 119 and a register 121, and the contents of the reister 121 are output to the multiplier 115. The conversion rate DDA corresponds to the distance between interpolation pixels, and is designated by a CPU (central processing unit), which is not illustrated. For example, when multiplied by K times, the value of 1/K is set at the register 118 to be used with the adder 120. The contents of this register 118 are added to the contents of the register 119 in which the present coordinate value is stored. This addition result (coordinate value) is outputted to the register 121. The above applies to reduction conversion, but enlargement conversion can be carried out in the same way. In enlargement conversion, the operation is carried out by taking the next secondary density information when the coordinate value exceeds "1".

For a more detailed description of the line density conversion means 7, we refer to the above-mentioned Japanese laid-open patent application no. 61-234170.

Figures 14A, 14B:
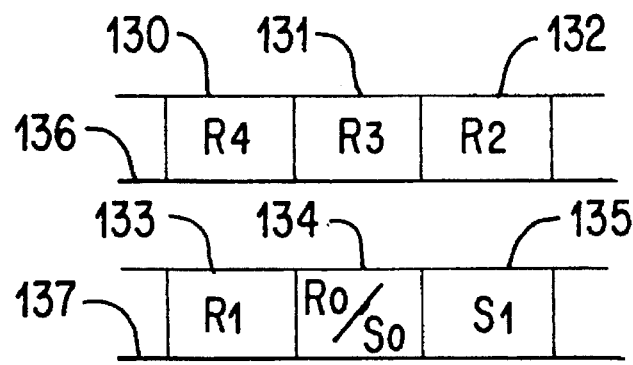
FIGS. 14(a)–14(b) show an embodiment of the binary coding processing performed by element 10 of FIG. 3.

FIG. 14 is a diagram of the binary coding processing according to this preferred embodiment. FIG. 14(*a*) shows two lines, of which the lower line 137 is being binary coded. The upper line 136 is the next line which will be binary coded. Of the secondary density information of the line 137 which are being binary coded, those being binary coded presently are shown by pixel 134, those after already binary coded by pixel 135, and those not yet binary coded by pixel 133. Simple binary coding can be executed by comparing the secondary density information, with the threshold value TH and by finding out which is larger. As for the error diffusion binary coding as mentioned in the document "An Adaptive Algorithm for Spatial Grey Scale" by R. Floyd et al, SID 75 DIGEST, p. 36/37, the secondary density information Ro is compared with the threshold value TH, a density value So after binary coding is decided on, and then to what degree the difference is generated in the secondary density information before and after binary coding is performed. And the correction operation is carried out for the secondary density information which have not been binary coded (130, 131, 132 and 133 in the example of FIG. 14(a)) around it to correct the difference. This processing order is shown in FIG. 14(b).

Figure 15:
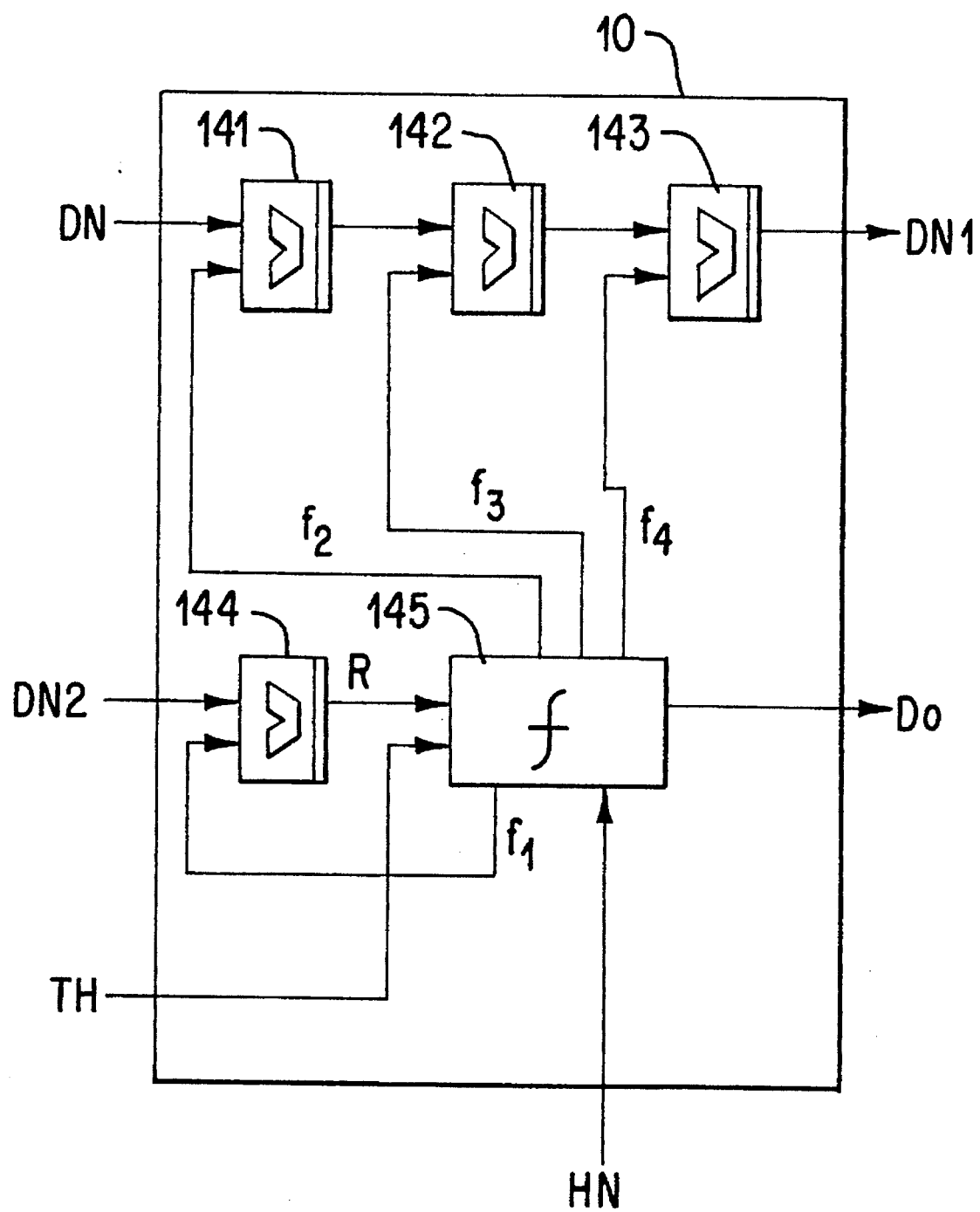
FIG. 15 shows an embodiment of the binary coding means 10 of FIG. 3.

FIG. 15 shows the binary coding means 10 of this preferred embodiment. An output DN from the line density conversion means 7 is outputted to the error memory 9 (FIG. 3) as DN1 through registers with adders 141, 142 and 143. An output of the error memory 9 is also inputted as DN2. This input DN2 is put into an error diffusion means 145 through a register with adder 144. In the error diffusion means 145, error correction means f2, f3, f4 and f1 by the binary coding are diffusively added to the registers 141, 142, 143 and 144 respectively.

Figure 16:
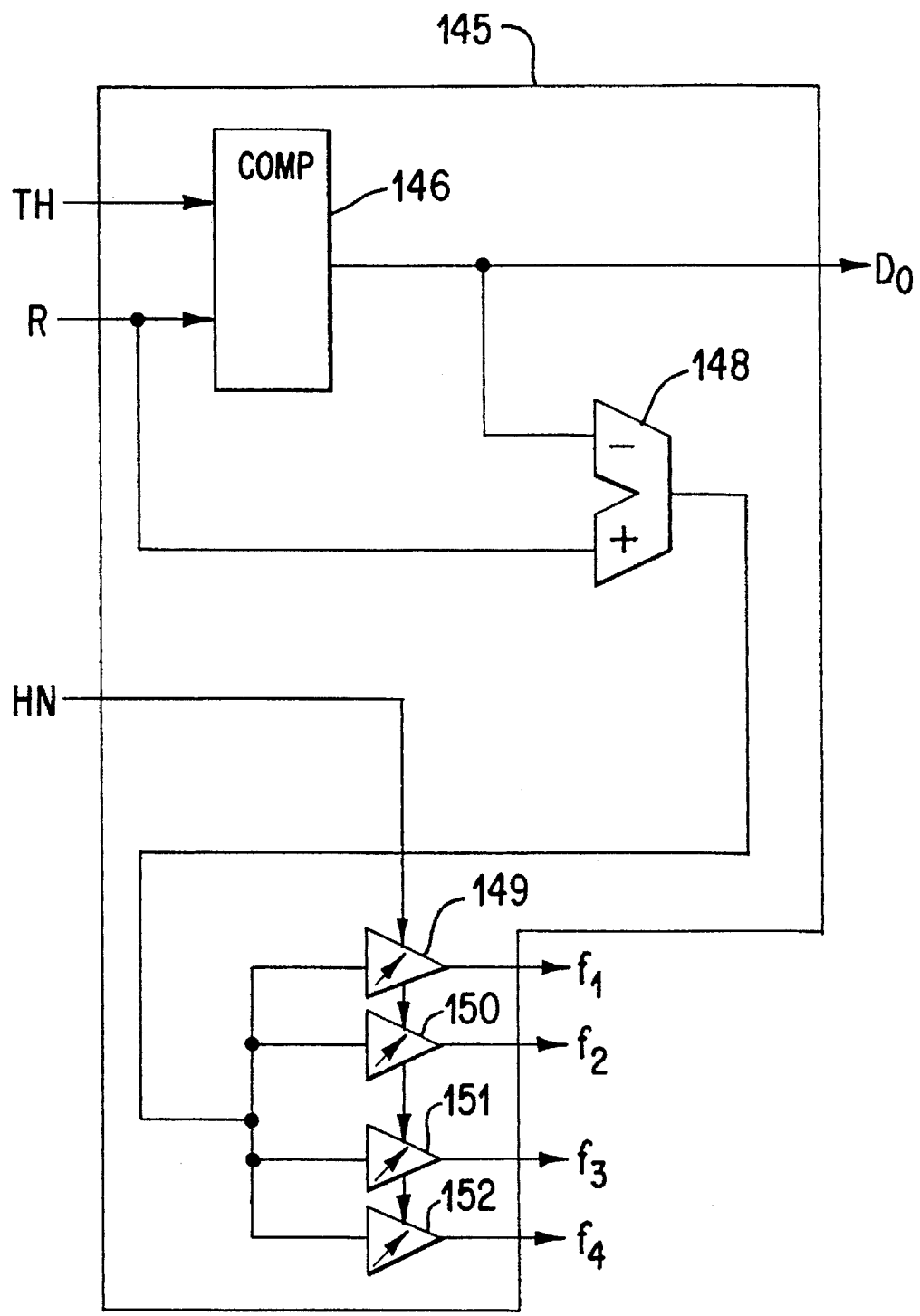
FIG. 16 shows an embodiment of the error diffusion means 145 of FIG. 5.

The error diffusion means 145 is shown in FIG. 16. A binary coding contrast input R (output of the register 144) and the threshold value TH are compared in a comparator 146 to output a binary coding result DO. Simply binary coding can be executed by comparing the secondary density information R with the threshold value TH in the comparator 146 to output a binary coding result DO. The difference between this output DO and the input R is distributed using multipliers 149, 150, 151 and 152, and outputted to the registers with adders 141, 142, 143 and 144 (FIG. 15), and are added with each input to diffuse the error. At this time, the values shown in FIG. 14(b) (7/16, 3/16, 5/16 and 1/16) are used as the coefficient values of the multipliers 149 to 152. Or, these coefficient values can be controlled using the output HN of the zone judgment means 6. In this case, it is possible to constitute it so that when it is judged to be a binary, coding zone in the zone judgment means 6, simple binary coding is carried out without diffusing, and when it is judged to be a halftone zone, error diffusion is carried out. In addition, when the judgment output of the zone judgment means 6 is no binary information, whether it is a binary coding zone or not, but is information relating to what degree it is a halftone zone, it is possible to execute more accurate binary coding by having this information reflected in the coefficient values of the multipliers 149 to 152.

For a more detailed description of the binary coding means 10, we refer to the Japanese laid-open patent application no. 63-288567 and the above mentioned Japanese laid-open patent application no. 61-234170.

Figure 17:
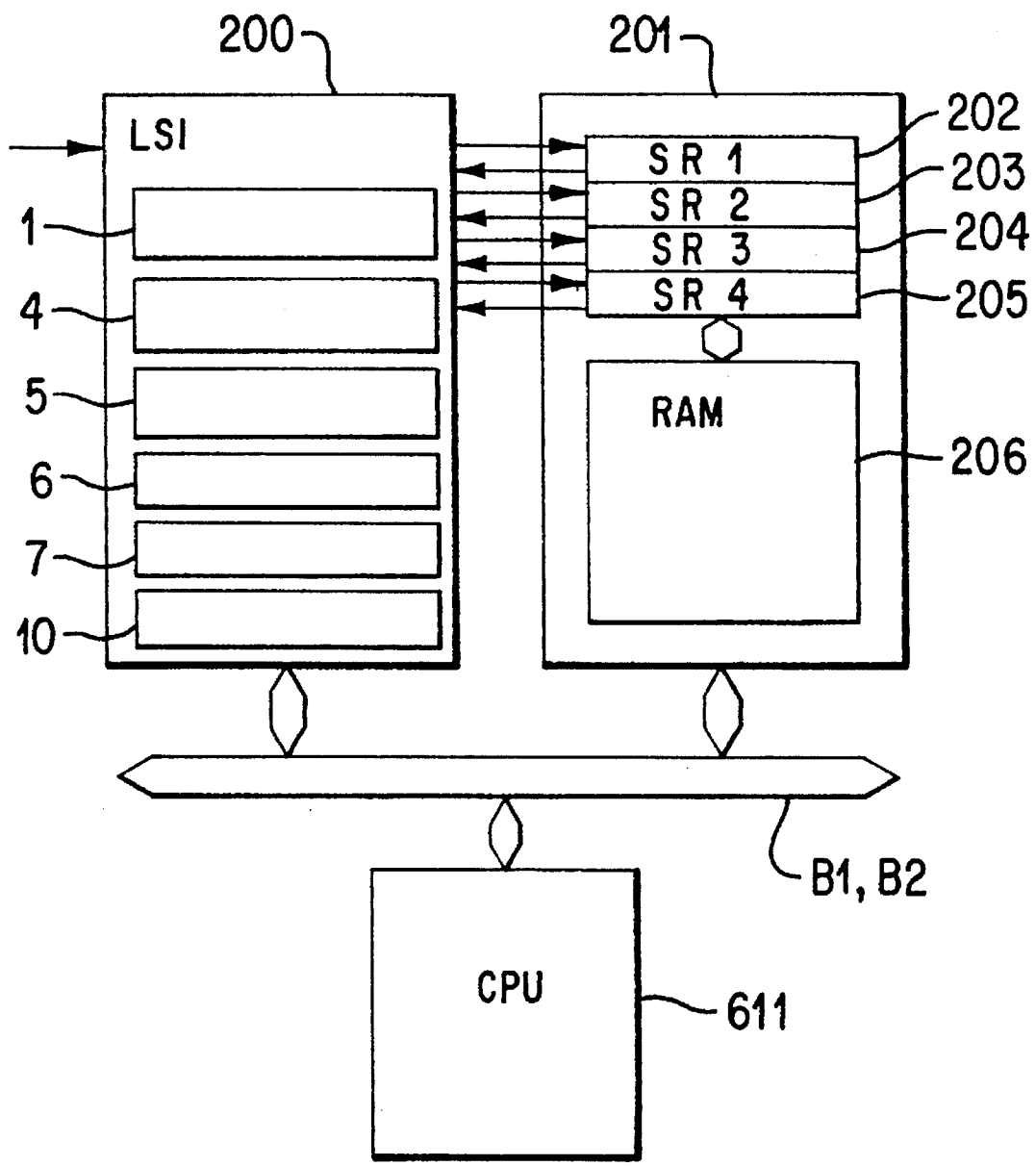
FIG. 17 shows another embodiment of the digital processor 507 of FIG. 2.

FIG. 17 shows the facsimile device according to another preferred embodiment of the present invention. In this preferred embodiment, the above-mentioned superfine operation means 1, the window matrix 4, the MTF correction means 5, the zone judgment means 6, the line density conversion means 7 and the binary coding means 10 are integrated on one semiconductor chip 200, and a high-function one-chip memory 201 for a display such as a page memory is used instead of the line memories 2 and 3 to obtain a reduction of the data transfer time. Shift registers 202, 203, 204 and 205 in this high-function memory 201 are operated as outside line memories of the LSI 200 and operation results and data are also transferred from the shift registers 202 to 205 through a bus 207 by a RAM 206, and data transfer by a CPU 611 becomes unnecessary. Incidentally, if there is no shift register, the RAM 206 can be used as a line memory. In addition, it is possible to increase the scanning line density by increasing the RAM capacity to a line memory.

FIG. 18 explains the recording operation of the recorder 615. When the size of the pixel to be recorded at the same time in the sub-scanning direction in the recording operation of the recorder 615 is substantially the same as the size of the non-overlapping part of pixel in superfine operation, the digital image signal at the encode/decode means 610 is directly transferred to the recorder 615. However, when the size of the pixel in the recording operation of the recorder 615 is different from the size of the non-overlapping part of pixel in superfine operation, especially when it is substantially the same as the size of pixel in superfine operation, the digital image signal can be modified like in the embodiment shown in FIG. 18.

In the embodiment of FIG. 18, the superfine operation and the recording operation are carried out with a pitch half the usual pitch (n=2). FIG. 18(a) shows binary coded secondary density information to be recorded in the sub-scanning direction. Binary coded secondary density information 710, 711 indicate "BLACK", and binary coded secondary density information 712, 713 indicate "WHITE". FIG. 18(b) shows recording pixels on the recording material in the sub-scanning direction corresponding to the coded secondary density, information 710, 711, 712 and 713. The recording pixel 701 ("BLACK") corresponds to the binary coded pixel density information 710, the recording pixel 702 ("BLACK") corresponds to the binary coded secondary density information 711, the recording pixel 703 ("WHITE") corresponds to the binary coded secondary density information 712, and the recording pixel 704 ("WHITE") corresponds to the binary coded secondary density information 713. Half of the pixel 702 to be recorded as "WHITE" is recorded as "BLACK" because half of the recording pixel of 703 overlaps half the recording pixel 702 recorded as "BLACK".

Therefore, the binary coded secondary density information 711 is modified from "BLACK" to "WHITE" as shown in FIG. 18(c). So, the recording pixel 702 is recorded as "WHITE", as shown in FIG. 18(d). In FIGS. 18(b) and 18(d), the recording pixels 702, 704 are represented having a gap in the main-scanning direction with regard to the portions 701, 703 for facilitating the explanation (can otherwise not be distinguished). There is no such gap in the embodiment. In another embodiment, such a gap can be in the main-scanning direction in FIG. 18(b) and FIG. 18(d). FIG. 18(e) shows the recording operation means having the function of the recording operation in the video signal processing means 608, preferably in the digital processor 507. The recording operation means comprises registers 721, 722, 723, line memories 724, 725, and logic operation means 26. Each of the registers 721, 722, 723 stores the binary coded secondary density information RA (e.g. 710), RB (e.g. 711), RC (e.g. 712) in the subscanning direction. The registers 721, 722 are connected through the line memory 724, and the registers 722, 723 are connected through the line memory 725. The logical operation means 726 is connected to the registers 721, 722, 723 and receives the output of each of the registers 721, 722, 723, and has a logical operation in the manner that if the binary coded secondary density information RA, RB indicate "BLACK" and RC indicates "WHITE", the binary coded secondary density information RB is modified from "BLACK" to "WHITE" as an output signal (RB').

Figure 19:
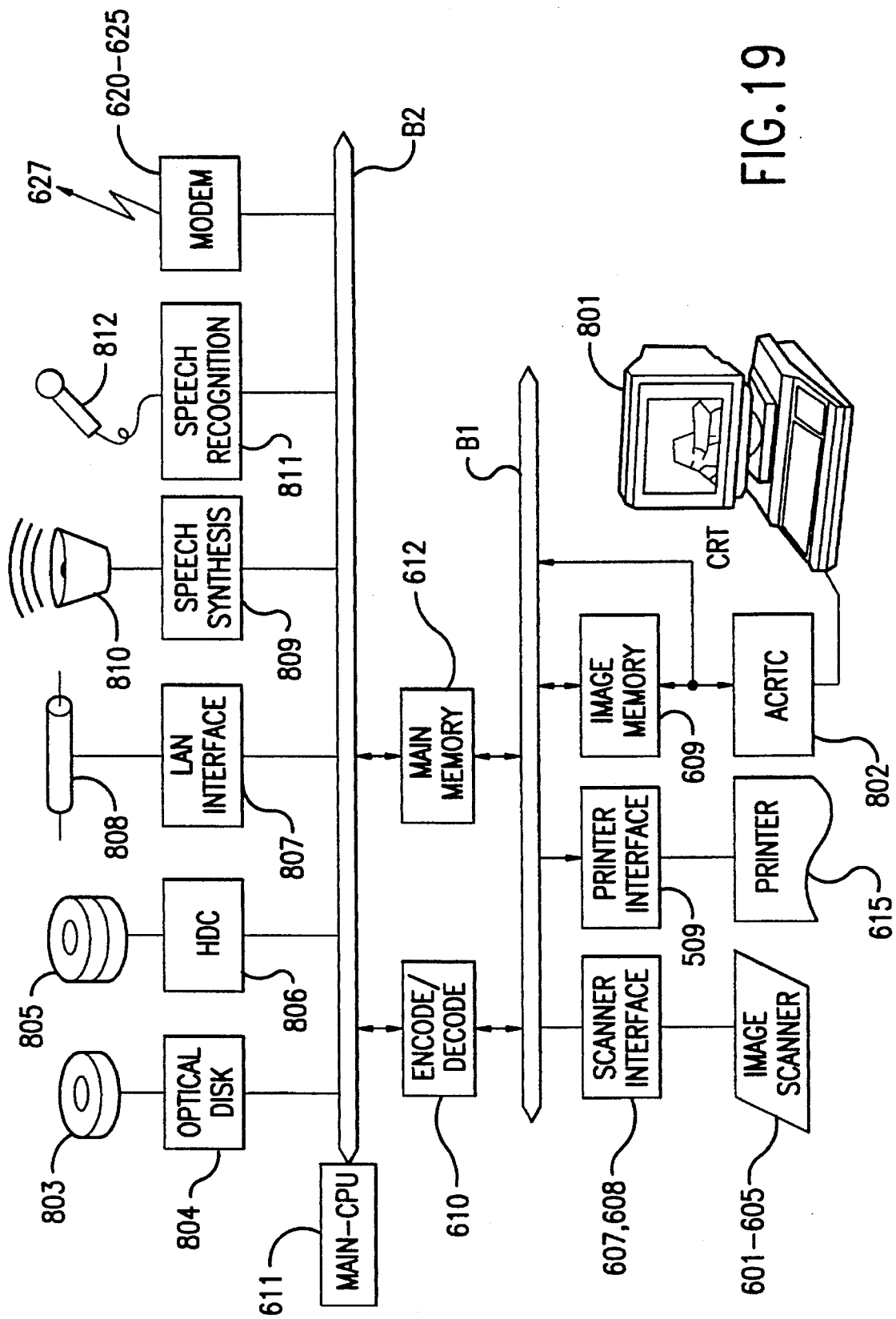
FIG. 19 shows an embodiment of a data processing system.

FIG. 19 shows an embodiment of a data processing system. The same designating numbers are set for those with the same function in FIG. 1. A display means 801 such as a Cathode Ray Tube device (CRT) for displaying the secondary density information on the screen, includes an input means such as a keyboard. A display control means 802 such as an Advanced Cathode Ray Tube Controller (ACRTC), connected to the image bus B1, the image memory 609 and the display means 801, controls the operation of the display means 801. An optical disc 803 stores the coded secondary density information optically, and an optical disc controller 804 which is conntected between the optical disc 803 and the system bus B2, controls the operation of the optical disc 803. A hard disc 805 stores the coded secondary density information magnetically, and a hard disc controller 806 which is connected between the hard disc 805 and the sytem bus B2, controls the operation of the hard disc 805. A LAN interface means has the function for transmitting the coded secondary density information to the local area network 808 and for receiving the coded secondary density information from the local area network 808. A speech synthesis means 809 synthesizes sound on the basis of the coded secondary density information to output the sound through a loudspeaker 810. A speech recognition means 811 recognizes the user's speech through a microphone 812.

What is claimed is:

1. A method for increasing the resolution of an image, comprising steps of:

(a) directing a means for measuring density information of a j th pixel of said image, wherein j is an integer and wherein part of said j th pixel overlaps a previously measured (j−1)th pixel and a part of said j th pixel does not overlap said previously measured (j−1)th pixel:

(b) measuring a primary density information $X_j$ representing density information of said j th pixel of said image;

(c) calculating a j th secondary density information $\Delta X_j$ which represents density information of said part of said j th pixel which does not overlap said (j−1)th pixel, based on at least said primary density information $X_j$ measured in step (b) and on a previously calculated secondary density information of said (j−1)th pixel;

(d) storing at least one of said j th primary density information $X_j$ and said j th secondary density information $\Delta X_j$;

(e) redirecting said means for measuring by a predetermined pitch in a predetermined direction, wherein said predetermined pitch is shorter than a width of said j th pixel in said predetermined direction; and (f) repeating steps (b) through (e) for subsequent pixels of said image.

2. The method according to claim 1, wherein the j th secondary density information $\Delta X_j$ is given by:

$$\Delta X_j = X_j - (\alpha_{j-1} \cdot X_{j-1} - \alpha_{j-n} \cdot \Delta X_{j-n})$$

or $$\Delta X_j = X_j - \sum_{k=j-n+1}^{j-1} \alpha_k \Delta X_k,$$

$\alpha_k$, $\alpha_{j-1}$, $\alpha_{-k}$ designating a predetermined correction coefficient, n being the ratio of the width in the predetermined direction of the part of the j th pixel which does not overlap the (j−1)th pixel towards the width of the j th pixel in the predetermined direction.

3. Method according to claim 2, wherein $\alpha_k \approx \alpha_{j-1} \approx \alpha_{j-k} \approx 1$.

4. The method according to claim 1, further comprising steps of:

coding said j th secondary density information $\Delta X_j$;

transmitting said j th secondary density information $\Delta X_j$ via a communication line;

displaying said j th secondary density information $\Delta X_j$ on a screen;

receiving said transmitted j th secondary density information $\Delta X_j$; and decoding said j th secondary density information $\Delta X_j$.

5. The method according to claim 1, further comprising steps of:

coding said j th secondary density information $\Delta X_j$;

transmitting said j th secondary density information $\Delta X_j$ via a communication line;

printing said j th secondary density information $\Delta X_j$ on a recording medium;

receiving said transmitted j th secondary density information $\Delta X_j$; and decoding said j th secondary density information $\Delta X_j$.

6. The method according to claim 1, further comprising steps of:

converting an optical signal including density information of a white plate to an electrical signal representing initial primary density information $X_0$; and storing said initial primary density information $X_0$ as said previously calculated secondary density information of said (j−1)th pixel.

7. The method according to claim 2, wherein n is at least 2.

8. A device for increasing the resolution of an image comprising:

(a) means for inputting primary density information $X_j$ representing density information of a j th pixel of said image, wherein j is an integer and said j th pixel includes a part which overlaps a previously input (j−1)th pixel and a part which does not overlap said previously input (j−1)th pixel;

(b) means for calculating a secondary density information $\Delta X_j$ which represents density information of said part of said j th pixel which does not overlap (j−1)th pixel, based on at least the j th primary density information $X_j$ and a previously calculated secondary density information of said (j−1)th pixel;

(c) means for storing at least one of said j th primary density information $X_j$ and said j th secondary density information $\Delta X_j$;

(d) means for receiving an initial primary density information $X_0$ as said previously calculated secondary density information of said (j−1)th pixel; and (e) means for positioning said means for inputting and for repositioning said means for inputting by a predetermined pitch in a predetermined direction wherein said predetermined pitch is shorter than a width of said j th pixel in said predetermined direction.

9. The device according to claim 8, further comprising means for calculating the j th secondary density information $\Delta X_j$ which represents pixel density information of said part of said jth pixel which does not overlap said (j−1)th pixel, based on at least said j th primary density information $X_j$ and on said previously calculated secondary density information of said (j−1)th pixel wherein $$kj\Delta X_j = X_j - (\alpha_{j-1} \cdot X_{j-1} - \alpha_{j-n} \cdot \Delta X_{j-n})$$

or $$\Delta X_j = X_j - \sum_{k=j-n+1}^{j-1} \alpha_k \cdot \Delta X_k,$$

wherein $\alpha_k$, $\alpha_{j-1}$, and $\alpha_{j-k}$ designate a predetermined correction coefficient, n is a ratio of the width in said predetermined direction of said part of said jth pixel which does not overlap said (j−1)th pixel towards said width in said predetermined direction of said a jth pixel.

10. The device according to claim 9, wherein $\alpha_k \approx \alpha_{j-1} \approx \alpha_{j-k} \approx 1$.

11. The device according to claim 9, further comprising means for selecting a value for n.

12. The device according to claim 8, further comprising a modulation function transfer correction processing means and a zone judgement processing means.

13. The device according to claim 12, wherein said modulation function transfer correction processing and the zone judgement processing are carried out using said j th secondary density information ($\Delta X_j$; Pi,j) stored in said means for storing.

14. The device according to claim 12, further comprising a line density conversion processing means and a binary coding processing means.

15. The device according to claim 14, wherein said modulation function transfer correction processing means and the binary coding processing means carry out operational processing by changing the value of their own operating parameters based on results obtained by the zone judgement processing means.

16. The device according to claim 12, wherein said zone judgement processing means includes a judgement parameter input means for carrying out zone separation designation by the user.

17. The device according to claim 12, wherein said modulation function transfer correction processing means carries out operation processing by referring to said secondary density information to be operated upon, and secondary density information of pixels surrounding said secondary density information to be operated upon.

18. The device according to claim 12, wherein when the output of the modulation function transfer correction processing exceeds a predetermined maximum value or is less than a predetermined minimum value, the parameters for the modulation function transfer correction are changed so that the density value is between both said predetermined maximum and minimum values.

19. The device according to claim 12, wherein the modulation function transfer correction processing means simultaneously operates on a plurality of secondary density information.

20. The device according to claim 12, wherein said zone judgement processing means is provided with a number of secondary density information in the main-scanning direction which is huger than the number of the secondary density information provided in the sub-scanning direction.

21. The device according to claim 20, wherein the zone judgement processing means is provided with a storing means for storing judgement results of the previous line.

22. The device according to claim 21, wherein the zone judgement processing means is provided with means for taking a boolean OR of the judgement result at the previous line and the judgement result at the present line, and outputting the result as a secondary judgement result.

23. The device according to claim 14, wherein the line density conversion processing means is provided with means for determining the density of interpolation secondary density information based on the distance between the interpolation secondary density information and reference secondary information.

24. The device according to claim 14, wherein the binary coding processing means is provided with an error diffusing means for controlling the diffusion of errors.

25. The device according to claim 14, wherein the diffusion of errors is stopped in the zone judged to ge a binary coding zone by said zone judgement result.

26. The device according to claim 14, wherein said binary coding processing means is provided with a simple binary coding means and an error diffusion binary coding means.

27. Device according to claim 8, further comprising a memory coupled with said means for storing the j th secondary density information $\Delta X_j$.

28. The device of claim 8 further comprising:

an encoding means for encoding the secondary density information into a predetermined code.

29. The device of claim 28, further comprising a transmitting means, connected to said encoding means, for transmitting the coded secondary density information to a communication line.

30. The device of claim 29, further comprising a memory means, connected to said encoding means, for storing the coded secondary density information.

31. The device of claim 28, further comprising a decoding means, for decoding the secondary density information which is coded into the predetermined code.

32. The device of claim 31, further comprising a signal receiving means, connected to the decoding means, for receiving the secondary density information which is coded into the predetermined code, from the communication line.

33. In a digital processor of a video signal processor which receives a digital signal related to the density of each of a plurality of pixels comprising an image, an image resolution enhancer comprising:

a) a subtractor, said subtractor having a first input which is provided with said digital signal, a second input, and an output, wherein said output is adapted to be provided with a signal representing a difference between the signal provided at said first input and a signal provided at said second input;

b) an M by N matrix register, said matrix register having N lines, each of said N lines having a series of M registers defining an input and an output; and c) N−1 line memories, each having an input and an output, wherein said input of a first of said N lines is coupled with said output of said subtractor, and said output of said first of said N lines is coupled with said input of a first of said N−1 line memories, wherein said output of said first of said N−1 line memories is coupled with said second input of said subtractor and said input of a next of said N lines, wherein said output of each of subsequent ones of said N lines are coupled with said input of a corresponding one of said N−1 line memories, and said output of said corresponding one of said N−1 line memories is coupled with a next of said N lines, and wherein said output of a last of said N lines is coupled with externally provided devices.

34. In a digital processor of a video signal processor which receives a digital signal related to the density of each of a plurality of pixels comprising an image, an image resolution enhancer comprising:

a) a subtractor, said subtractor having a first input which is provided with said digital signal, a second input, and an output, wherein said output is adapted to be provided with a signal representing a difference between the signal provided at said first input and a signal provided at said second input;

b) an adder having N−1 inputs and an output, said output of said adder is adapted to be provided with a signal representing the sum of each of said N−1 inputs and is coupled with said second input of said subtractor;

c) an M by N matrix register, said matrix register having N lines, each of said N lines having a series of M registers defining an input and an output; and d) N−1 line memories, each having an input and an output, each of said outputs of said N−1 line memories being coupled with a corresponding one of said N−1 inputs of said adder, wherein said output of said first of said N lines is coupled with said input of a first of said N−1 line memories, wherein said output of each of said N lines is coupled with said input of a corresponding one of said N−1 line memories, and said output of said corresponding one of said N−1 line memories is coupled with said input of a next of said N lines, and wherein said output of a last of said N lines is coupled with externally provided devices.

35. The image resolution enhancer of claim 34 further comprising N−1 user controllable switches, each of said N−1 user switches being provided at a corresponding one of said N−1 inputs of said adder.

36. A facsimile system comprising:

(a) a light source adapted to direct light to a document;

(b) an image sensor adapted to receive an optical signal including image information reflected by said document and to convert said optical signal into an electrical signal;

(c) means for determining primary density information $X_j$ representing density information of a j th pixel of said image based on said electrical signal produced by said image sensor, wherein j is an integer and said j th pixel includes a part which overlaps a previously input (j−1)th pixel and a part which does not overlap said previously input (j−1)th pixel;

(d) means for calculating a secondary density information $\Delta X_j$ which represents density information of said part of said j th pixel which does not overlap said (j−1)th pixel, based on at least the j th primary density information $X_j$ and a previously calculated secondary density information of said (j−1)th pixel;

(e) means for storing at least one of said j th primary density information $X_j$ and said j th secondary density information $\Delta X_j$;

(f) means for receiving an initial primary density information $X_0$ as said previously calculated secondary density information of said (j−1)th pixel; and (g) means for positioning said image sensor and for repositioning said image sensor with respect to said document by a predetermined pitch in a predetermined direction wherein said predetermined pitch is shorter than a width of said j th pixel in said predetermined direction.

37. The facsimile system of claim 36 further comprising:

a white plate, wherein said image sensor is adapted to receive an optical signal reflected by said white plate from said light source and representing density information of said white plate, and wherein said image sensor is adapted to convert said received optical signal of said density information of said white plate to an electrical signal representing one of said previously calculated secondary density information, and said initial primary density information.

38. The facsimile system of claim 37 further comprising means for displaying said j th secondary density information.

39. The facsimile system of claim 36 further comprising a storage device for storing said secondary density information.

40. The facsimile system of claim 39, wherein said storage device is an optical disk.

41. The facsimile system of claim 39, wherein said storage device is a magnetic disk.

42. The facsimile system of claim 39 further comprising means for data communication including a local area network and a local area network interface, said means for data communication adapted to facilitate the transfer of said secondary density information between said storage device and said means for calculating.

43. The facsimile system of claim 37, further comprising means for producing speech sounds in response to said secondary density information.

44. The facsimile system of claim 37, further comprising means for recognizing human speech and converting that speech into an information signal.

45. The facsimile system of claim 37, further comprising a speech synthesis means for producing speech sounds in response to the secondary density information.

* * * * *

UNITED STATES PATENT AND TRADEMARK OFFICE
CERTIFICATE OF CORRECTION

PATENT NO. : 5,566,253
DATED : 15 October 1996
INVENTOR(S) : Keisuke NAKASHIMA et al.

It is certified that error appears in the above-indentified patent and that said Letters Patent is hereby corrected as shown below:

| Column | Line | |
|---|---|---|
| 1 | 34 | Change "Processor," to --Processor",-- . |
| 4 | 42 | Change "rectangular" to --rectable-- . |
| 4 | 60 | Change "So there" to --Thus, there-- . |
| 5 | 47 | After "density" delete "," . |
| 6 | 25 | change "is proceeded" to --is performed-- . |
| 6 | 42 | Change "$\Delta X_{406} = X_{406} - \Delta X_{406}'$" to --$\Delta X_{406} = X_{406} - \Delta X'_{406}$-- |
| 7 | 27 | Change "$\alpha j$-" to --$\alpha_{j-n} \approx 1$.-- . |
| 7 | 28 | Delete "$n \approx 1$". |
| 7 | 37 | After "set" change "the" to --to be a-- . |

UNITED STATES PATENT AND TRADEMARK OFFICE
CERTIFICATE OF CORRECTION

PATENT NO. : 5,566,253

DATED : 15 October 1996

INVENTOR(S) : Keisuke NAKASHIMA et al.

It is certified that error appears in the above-indentified patent and that said Letters Patent is hereby corrected as shown below:

| Column | Line | |
|---|---|---|
| 8 | 24 | After "density" delete ",". |
| 8 | 39 | Change "decide" to --determine--. |
| 9 | 49 | Before "determined" insert --to be--. |
| 10 | 17 | After "out" delete "a". |
| 10 | 18 | After "through" insert --a--. |
| 10 | 19 | After "points" insert --.--. |
| 10 | 49 | Change "reister" to --register--. |
| 11 | 5 | Delete "after". |
| 13 | 30 | Change "conntected" to --connected--. |
| 13 | 34 | Change "sytem" to --system--. |
| 15 | 33 | After "said" delete "a". |
| 16 | 12 | Change "huger" to --larger--. |

UNITED STATES PATENT AND TRADEMARK OFFICE
CERTIFICATE OF CORRECTION

PATENT NO. : 5,566,253
DATED : 15 October 1996
INVENTOR(S) : Keisuke NAKASHIMA et al.

It is certified that error appears in the above-indentified patent and that said Letters Patent is hereby corrected as shown below:

| Column | Line | |
|--------|------|---|
| 16 | 30 | Change "ge" to --get--. |

Signed and Sealed this

Fifteenth Day of July, 1997

Attest:

BRUCE LEHMAN

Attesting Officer     Commissioner of Patents and Trademarks